(12) United States Patent
Morita et al.

(10) Patent No.: US 12,344,302 B2
(45) Date of Patent: Jul. 1, 2025

(54) STEERING WHEEL

(71) Applicants: TOYODA GOSEI CO., LTD., Kiyosu (JP); TOYOTA JIDOSHA KABUSHIKI KAISHA, Toyota (JP)

(72) Inventors: Bunpei Morita, Aichi-ken (JP); Masato Mito, Aichi-ken (JP); Ryuichi Okashita, Miyoshi (JP); Motoya Funatsu, Toyota (JP)

(73) Assignees: TOYODA GOSEI CO., LTD., Aichi-pref. (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 80 days.

(21) Appl. No.: 18/352,531

(22) Filed: Jul. 14, 2023

(65) Prior Publication Data

US 2024/0025465 A1  Jan. 25, 2024

(30) Foreign Application Priority Data

Jul. 21, 2022  (JP) ................. 2022-116561

(51) Int. Cl.
*B62D 1/04* (2006.01)
*B60K 26/02* (2006.01)
(Continued)

(52) U.S. Cl.
CPC .............. *B62D 1/046* (2013.01); *B60K 26/02* (2013.01); *B60T 7/102* (2013.01); *B62D 1/06* (2013.01); *B60K 2026/028* (2013.01)

(58) Field of Classification Search
CPC ..... B62D 1/046; B60K 2026/028; G05G 1/04
See application file for complete search history.

(56) References Cited

U.S. PATENT DOCUMENTS 7,017,704 B2 * 3/2006 Kapaan ................. B62D 1/046
                                                              180/315
9,393,867 B2 * 7/2016 Downey .................. G05G 1/04
(Continued)

FOREIGN PATENT DOCUMENTS

EP     2915689 A1 *  9/2015  ............. B60K 26/02
EP     3 287 309 A1     2/2018
(Continued)

OTHER PUBLICATIONS

Computer generated English translation of WO 2007/051523 (Year: 2024).*

*Primary Examiner* — Paul N Dickson
*Assistant Examiner* — Tiffany L Webb
(74) *Attorney, Agent, or Firm* — POSZ LAW GROUP, PLC

(57) ABSTRACT

A steering wheel includes a boss portion disposed at a rotation steering center side, a grip portion disposed around the boss portion, and an operation lever portion disposed between the boss portion and the grip portion. The operation lever portion is pivotally supported by a rotation shaft portion provided close to the boss portion, and is configured to allow a press-down operation and a pull-up operation while the grip portion is gripped. A press-down operation surface of the operation lever portion is disposed along a grip surface being an upper surface of the grip portion, at a side separated from the rotation shaft portion and close to the grip portion, between the grip surface and an upper surface of a pad covering an upper surface of the boss portion. The rotation shaft portion is disposed above a lower end surface of the grip portion to be covered with the pad.

5 Claims, 14 Drawing Sheets

(51) Int. Cl.
  *B60T 7/10*  (2006.01)
  *B62D 1/06*  (2006.01)

(56) References Cited

U.S. PATENT DOCUMENTS

| | | | |
|---|---|---|---|
| 9,764,639 B2* | 9/2017 | Park | A61F 4/00 |
| 9,770,983 B2* | 9/2017 | Wells | B60K 26/02 |
| 10,308,114 B2* | 6/2019 | Downey | G05G 1/04 |
| 2004/0108161 A1* | 6/2004 | Ohno | B60W 10/06 |
| | | | 180/315 |
| 2024/0025466 A1* | 1/2024 | Morita | G05G 9/02 |
| 2024/0336132 A1* | 10/2024 | Morita | B60W 50/12 |

FOREIGN PATENT DOCUMENTS

| | | | | |
|---|---|---|---|---|
| JP | H05-270410 A | 10/1993 | | |
| JP | H09-150781 A | 6/1997 | | |
| JP | 2008-014204 A | 1/2008 | | |
| JP | 6229221 B2 | 10/2016 | | |
| WO | WO-2007051523 A1 * | 5/2007 | | B60K 20/06 |

* cited by examiner

STEERING WHEEL

CROSS-REFERENCE TO RELATED APPLICATIONS

This application claims priority from Japanese Patent Application No. 2022-116561 filed on Jul. 21, 2022, the entire subject-matter of which is incorporated herein by reference.

TECHNICAL FIELD

The present disclosure relates to a steering wheel including a boss portion disposed at a side of a rotation steering center, a grip portion disposed around the boss portion and gripped during rotation steering, and an operation lever portion disposed in a region between the boss portion and the grip portion.

BACKGROUND ART

JPH05-2780410A discloses a steering wheel has a configuration in which an operation lever portion through which an accelerator operation and a brake operation can be received is disposed between a boss portion and a grip portion. In the steering wheel, the operation lever portion is operable while the grip portion is gripped, and includes a first operation portion that can be operated at an upper surface side of the grip portion and a second operation portion that can be operated at a lower surface side of the grip portion. The first operation portion has a pressed surface disposed substantially along an upper surface of the grip portion at the upper surface side, and is pivotally supported by a rotation shaft portion disposed at a side of the boss portion so as to be rotatably operable to press the pressed surface downward.

However, in the above steering wheel, the second operation portion enables to rotate through a rotation shaft portion different from the rotation shaft portion for rotating the first operation portion. Since the operation lever portion includes two rotation shaft portions, the configuration is not simple. In the above steering wheel, the pressed surface formed on the first operation portion is disposed substantially above the rotation shaft portion for rotating the first operation portion. Therefore, in the above steering wheel, for example, in a case where a region above the rotation shaft portion is pressed on the pressed surface, it is difficult to press down the first operation portion, and the press-down operation cannot be stably performed.

SUMMARY OF INVENTION

An object of the present disclosure is to provide a steering wheel that has a simple structure and enables to be stably operated.

The steering wheel according to the present disclosure includes a boss portion disposed at a side of a rotation steering center, a grip portion disposed around the boss portion and gripped during rotation steering, and an operation lever portion disposed in a region between the boss portion and the grip portion, in which the operation lever portion is pivotally supported by a rotation shaft portion provided at a side of the boss portion, is configured to allow two operations including a press-down operation of pressing the operation lever portion downward and a pull-up operation of lifting the operation lever portion upward while the grip portion is gripped, and is configured to receive an accelerator operation and a brake operation by the two operations performed, a press-down operation surface of the operation lever portion is disposed substantially along a grip surface of the grip portion, at a side separated from the rotation shaft portion and close to the grip portion, between the grip surface of the grip portion and an upper surface of a pad disposed to cover an upper surface of the boss portion, the grip surface being formed of an upper surface, which is substantially orthogonal to a rotation steering central axis, of the grip portion, and the rotation shaft portion is disposed above a lower end surface of the grip portion to be covered with the pad.

In the steering wheel according to the present disclosure, the operation lever portion used for the accelerator operation and the brake operation is operable while the grip portion is gripped, and the two operations including the press-down operation of pressing the operation lever portion downward and the pull-up operation of lifting the operation lever portion upward are performed by a rotation operation through the single rotation shaft portion provided at the side of the boss portion so that the operation lever portion receives the accelerator operation and the brake operation. Therefore, as compared with an operation lever portion of a steering wheel of the related art in which two rotation shaft portions are provided, the configuration of the present disclosure can be simplified. In the steering wheel according to the present disclosure, since the press-down operation surface, which is operated to be pressed downward in the operation lever portion, is not disposed across the rotation shaft portion, but is disposed at the side separated from the rotation shaft portion and close to the grip portion, it is possible to stably perform the press-down operation no matter which region of the press-down operation surface is pressed. In the steering wheel of the present disclosure, the press-down operation surface is disposed between the grip surface of the grip portion and the upper surface of the pad, and the rotation shaft portion is disposed above the lower end surface of the grip portion to be covered with the pad. That is, in the steering wheel of the present disclosure, a rotation radius of the press-down operation surface during the press-down operation (during the rotation operation) is relatively large, and the press-down operation surface is disposed substantially laterally of the rotation shaft portion. A direction of inputting a pressing force during pressing down the press-down operation surface is a direction substantially along a tangential direction in a trajectory during the rotation operation with the rotation shaft portion as the center thereof, but in the steering wheel of the present disclosure, the direction of inputting the pressing force can be approximated in a direction substantially orthogonal to the grip surface, and it is thus possible to press the operation lever portion downward by pressing the press-down operation surface substantially directly downward. Therefore, the operation lever portion can be easily pressed downward without pressing down the press-down operation surface with a strong force. In the steering wheel of the present disclosure, since the press-down operation surface is disposed close to the grip portion, a driver gripping the grip portion can press down the press-down operation surface with a part of a hand near the base of a thumb (thumb ball of a palm, that is, thenar). That is, in the steering wheel of the present disclosure, since the press-down operation surface can be stably pressed down on a wide surface near the thumb ball of the palm, the operability is good, and since it is easier to apply a force to a part near the thumb ball as compared with the case of pressing the press-down operation surface with a fingertip, a press-down state can be stably maintained for a predetermined time. As a result, it is possible to stably perform the brake operation or the accelerator operation by such a press-down operation.

Therefore, the steering wheel of the present disclosure has a simple structure and can be stably operated.

In the steering wheel according to the present disclosure, since the rotation shaft portion is disposed above an approximate center in an up-down direction of the grip portion, a separation distance between the rotation shaft portion and the press-down operation surface in the up-down direction can be further reduced, the direction (direction substantially along the tangential direction in the trajectory during the rotation operation with the rotation shaft portion as the center thereof) of inputting the pressing force during pressing down the press-down operation surface is further approximated in the direction substantially orthogonal to the grip surface, and the operability of the press-down operation of the operation lever portion is further improved, which is preferable.

Further, in the steering wheel having the above configuration, it is preferable that the operation lever portion includes a press-down operation portion having the press-down operation surface on an upper surface of the operation lever portion and disposed substantially along the grip surface, and a pull-up operation portion disposed at a lower end extending downward from an end portion of the press-down operation portion close to the grip portion, the pull-up operation portion is configured to allow a lower end surface of the operation lever portion and a surface close to the boss portion, which is disposed substantially along the rotation steering central axis at the lower end of the operation lover portion, to serve as a pull-up operation surface, and the pull-up operation surface is disposed in a region below the lower end surface of the grip portion.

In the steering wheel having the above configuration, the pull-up operation portion is disposed at the lower end extending downward from the end portion of the press-down operation portion having the press-down operation surface close to the grip portion, and the pull-up operation surface including the lower end surface of the pull-up operation portion and the surface at the lower end close to the boss portion is disposed in the region below the lower end surface of the grip portion. That is, in the steering wheel having the above configuration, the pull-up operation surface is disposed separated from the rotation shaft portion in the up-down direction as compared with the press-down operation surface. Similar to the direction of inputting the pressing force during pressing down the press-down operation surface, a direction of inputting a tensile force during pulling up the pull-up operation portion is the direction substantially along the tangential direction in the trajectory during the rotation operation with the rotation shaft portion as the center thereof, but since the pull-up operation surface is disposed separated from the rotation shaft portion in the up-down direction than the press-down operation surface, the direction of inputting the tensile force is along an oblique direction that approaches the grip portion while being inclined with respect to the grip surface. Therefore, when the driver presses four fingers (forefinger, middle finger, and the like) of the hand gripping the grip portion excluding the thumb against the pull-up operation surface formed at the lower end of the pull-up operation portion and pulls the pull-up operation surface to the near side (toward the grip portion), the operation lever portion can be lifted with respect to the grip portion. As a result, the operability during lifting the operation lever portion with respect to the grip portion is improved. Such a pull-up operation can be implemented by an operation of gripping the pull-up operation portion with the fingertip of the hand gripping the grip portion, and thus the pull-up state can be stably maintained for a predetermined time.

DESCRIPTION OF EMBODIMENTS

Figure 1:
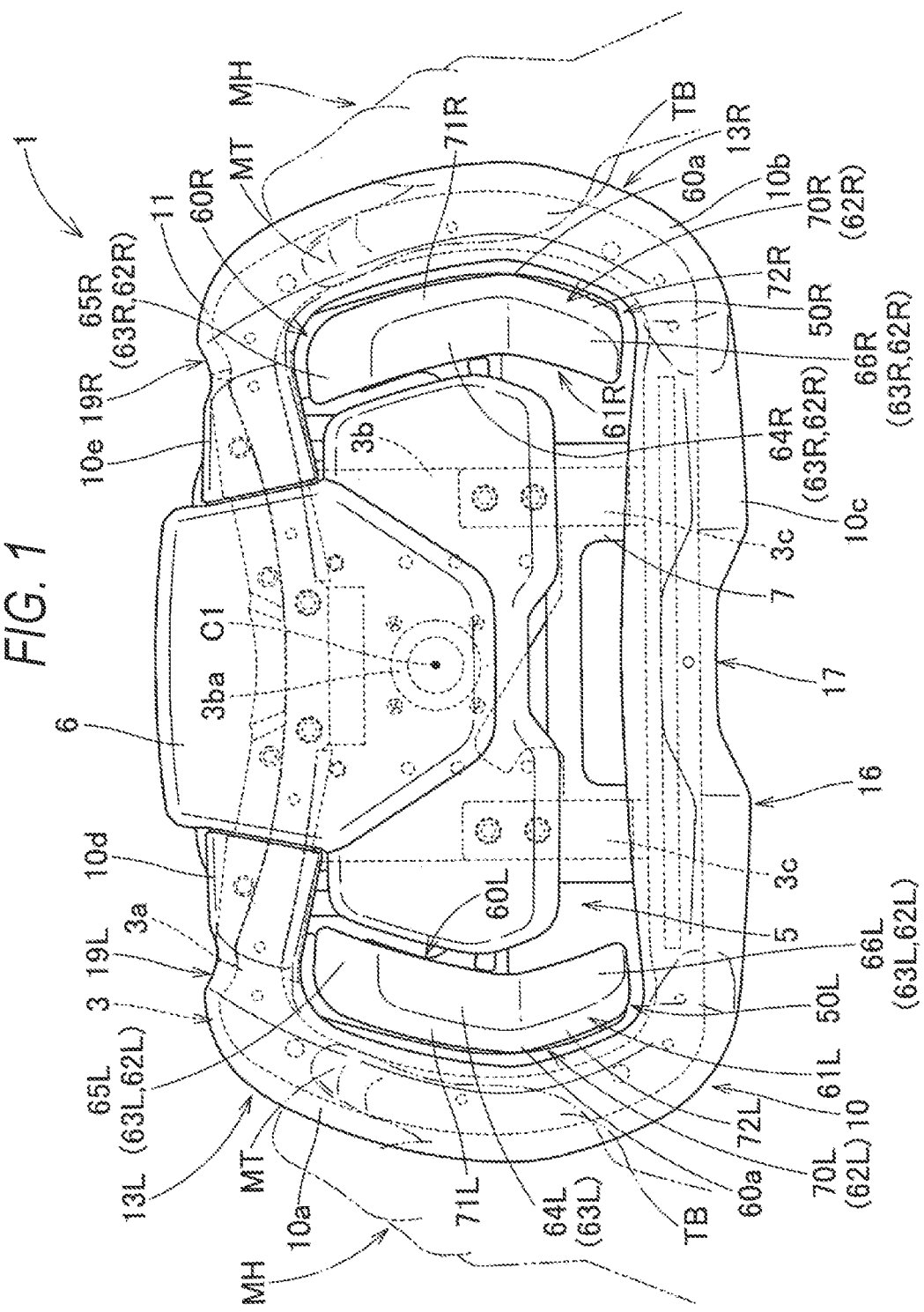
FIG. 1 is a plan view of a steering wheel according to an embodiment of the present disclosure.
Figure 2:
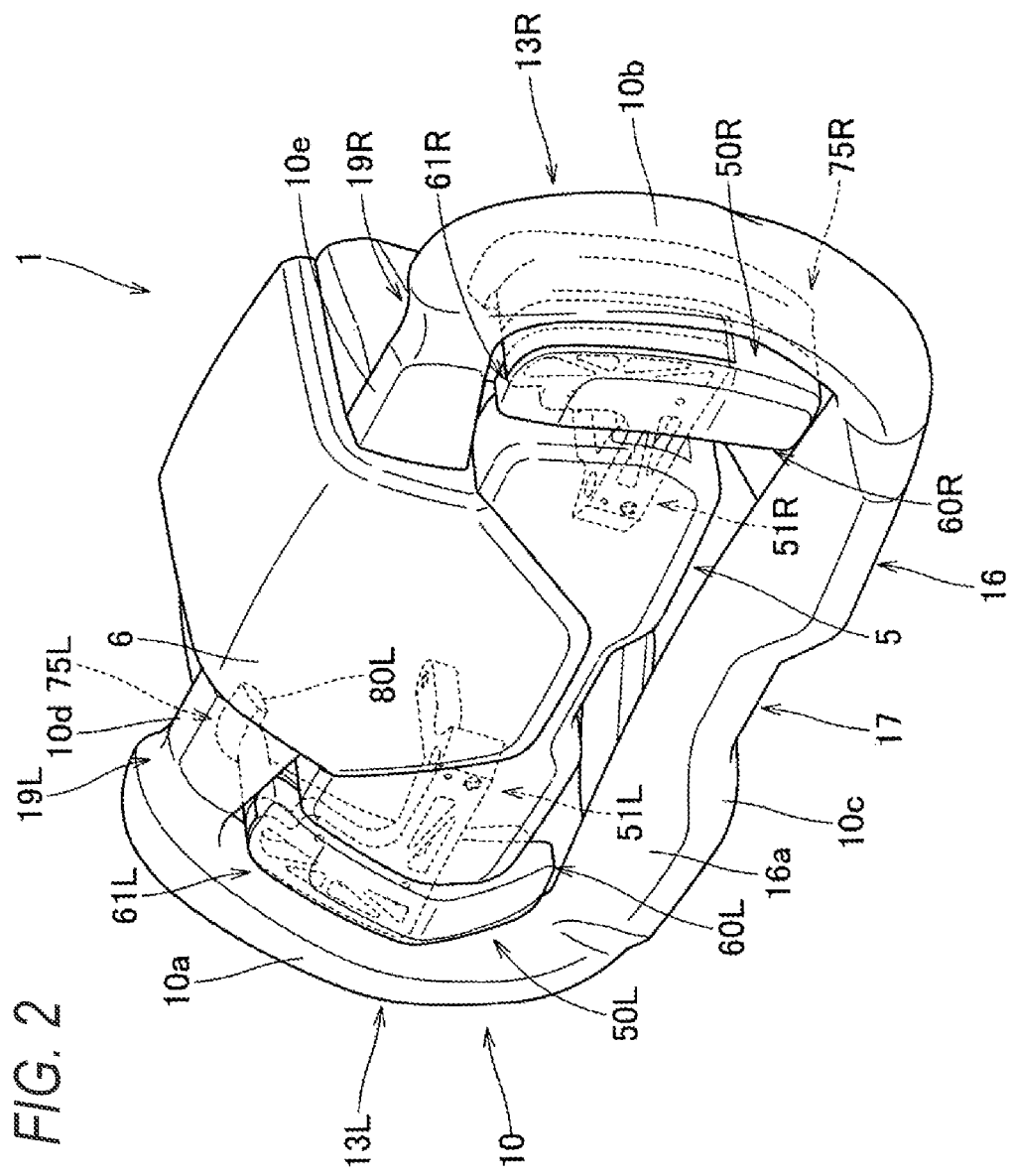
FIG. 2 is a perspective view of the steering wheel according to the embodiment.
Figure 3:
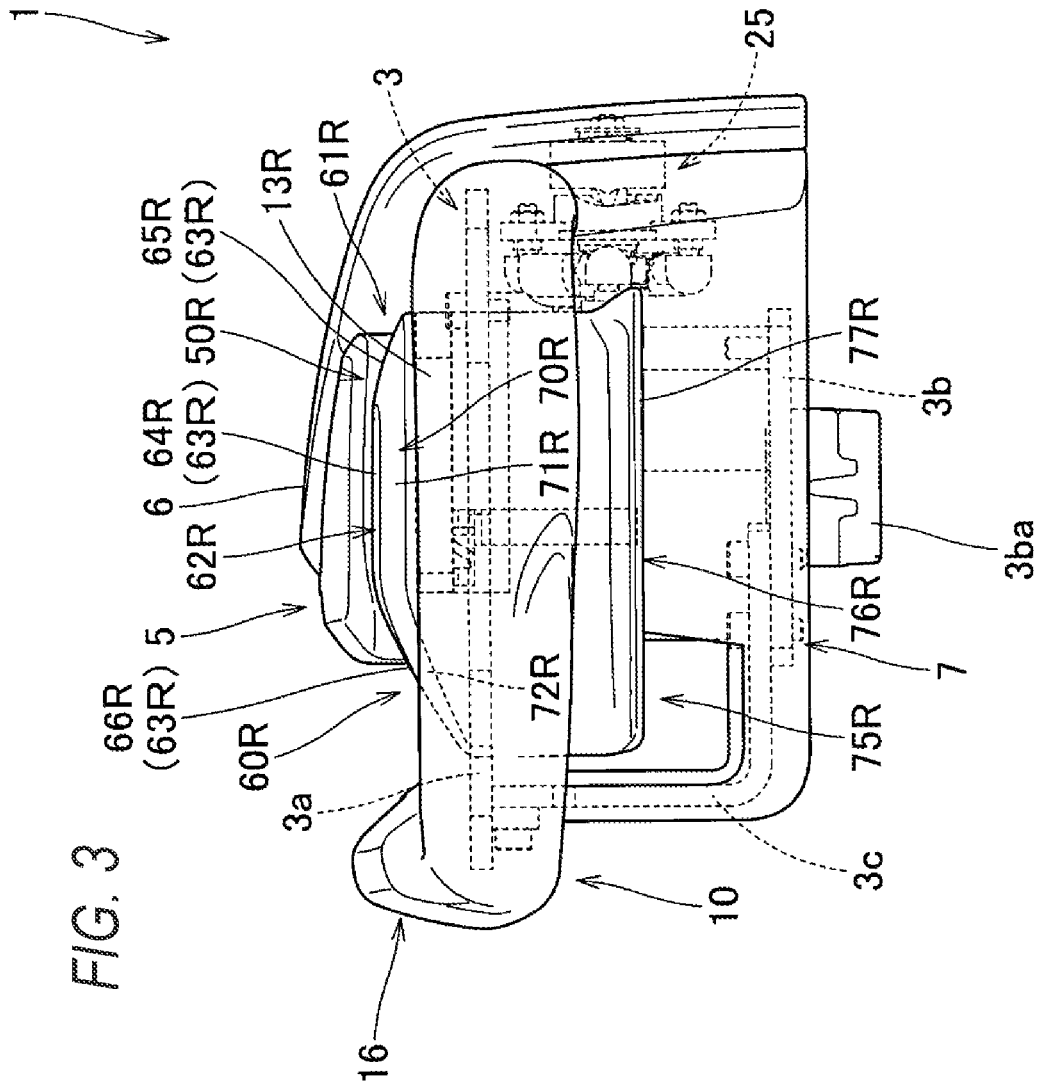
FIG. 3 is a right side view of the steering wheel according to the embodiment.

Hereinafter, an embodiment of the present disclosure will be described with reference to the drawings. As shown in FIGS. 1 to 3, a steering wheel 1 according to the embodiment includes a boss portion 5 disposed at a side of a rotation steering central axis C1, a grip portion 10 disposed around the boss portion 5 and gripped during rotation steering, and operation lever portions 50L and 50R disposed in a region between the boss portion 5 and the grip portion 10. In the steering wheel 1 according to the embodiment, as shown in FIG. 1, the grip portion 10 is formed in a substantially rectangular annular shape that is widened in a left-right direction in a straight steering state, and the pair of left and right operation lever portions 50L and 50R are disposed on right and left sides of the boss portion 5, respectively. In the steering wheel 1 according to the embodiment, the pair of left and right operation lever portions 50L and 50R are synchronized in rotation operations by a link mechanism 25 disposed in the boss portion 5. In the steering wheel 1 according to the embodiment, as shown in FIGS. 1 and 2, each of the operation lever portions 50L and 50R is widely disposed in a front-rear direction so as to fill a gap between a pad 6, which will be described later, disposed above an upper surface of the boss portion 5 and the grip portion 10 (main grip regions 13L and 13R which will be described later) when viewed in an up-down direction. That is, the steering wheel 1 according to the embodiment is not configured to allow a driver to put his/her fingers between the main grip regions 13L and 13R of the grip portion 10 and the operation lever portions 50L and 50R, but is configured to allow the driver to put his/her hands (fingers) only in a gap between the pad 6 and a rear portion 10c (hand rest portion 16) of the grip portion 10, which will be described later (see FIG. 1).

The steering wheel 1 according to the embodiment includes a core member 3 disposed to connect the boss portion 5 and the grip portion 10 to each other. The core member 3 is made of a sheet metal made of an aluminum alloy or the like, and includes, as shown in FIGS. 1 and 3, a grip portion core member 3a disposed in the region of the grip portion 10, a boss portion core member 3b disposed in the region of the boss portion 5, and connecting members 3c connecting the grip portion core member 3a and the boss portion core member 3b. In the case of the embodiment, the connecting members 3c are disposed at two positions in the left-right direction so as to connect a rear edge of the boss portion core member 3b and a rear region of the grip portion core member 3a (see FIGS. 1 and 4).

In the present description, unless otherwise specified, with reference to the straight steering state of the steering wheel 1 mounted on a vehicle, a direction along the rotation steering central axis C1 (see FIG. 6) of the grip portion 10 is defined as the up-down direction, a direction orthogonal to the rotation steering central axis C1 and substantially along a front-rear direction of the vehicle is defined as the front-rear direction, and a direction orthogonal to the rotation steering central axis C1 and substantially along a left-right direction of the vehicle is defined as the left-right direction.

Figure 5:
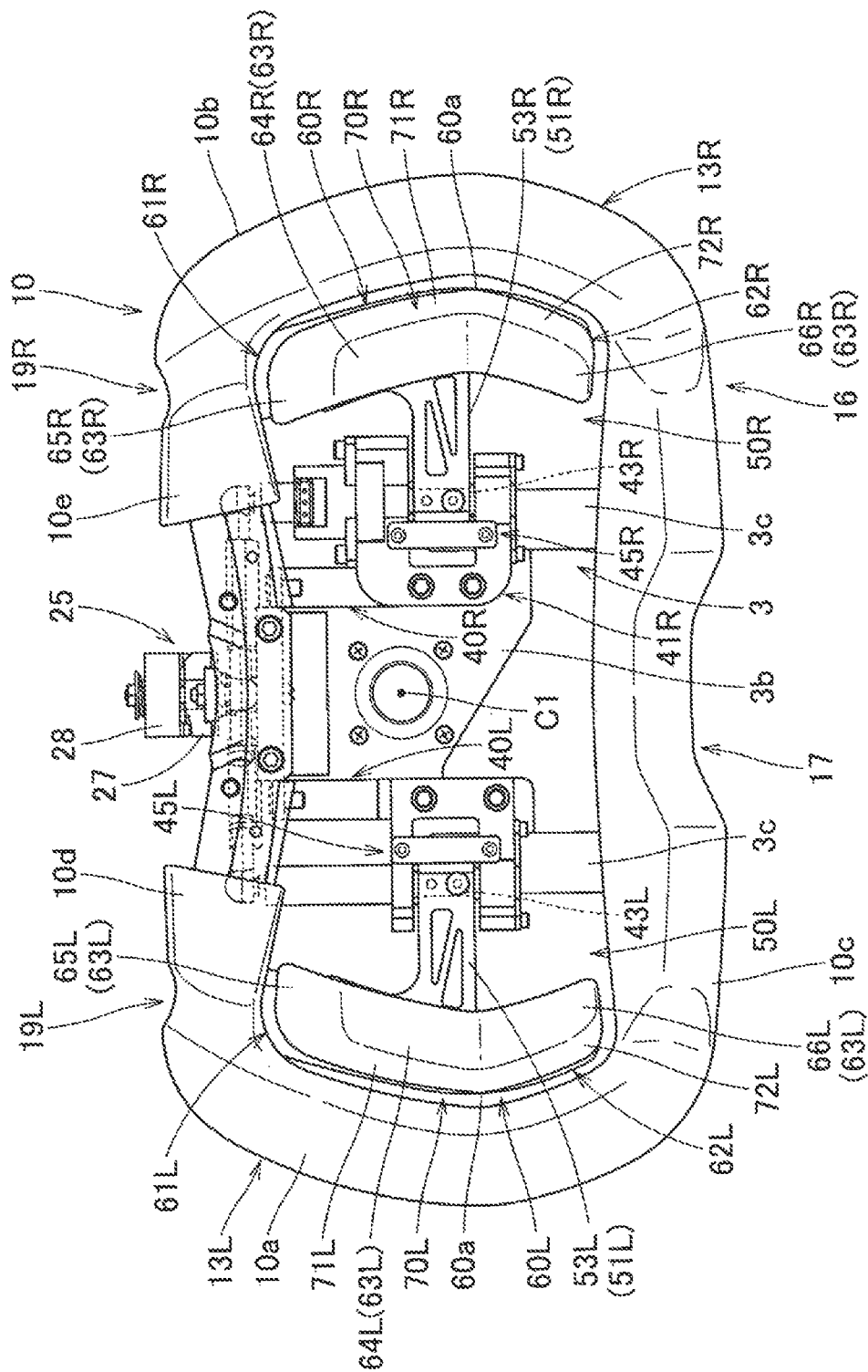
FIG. 5 is a schematic plan view of the steering wheel according to the embodiment, with the pad and the lower cover removed.
Figure 6:
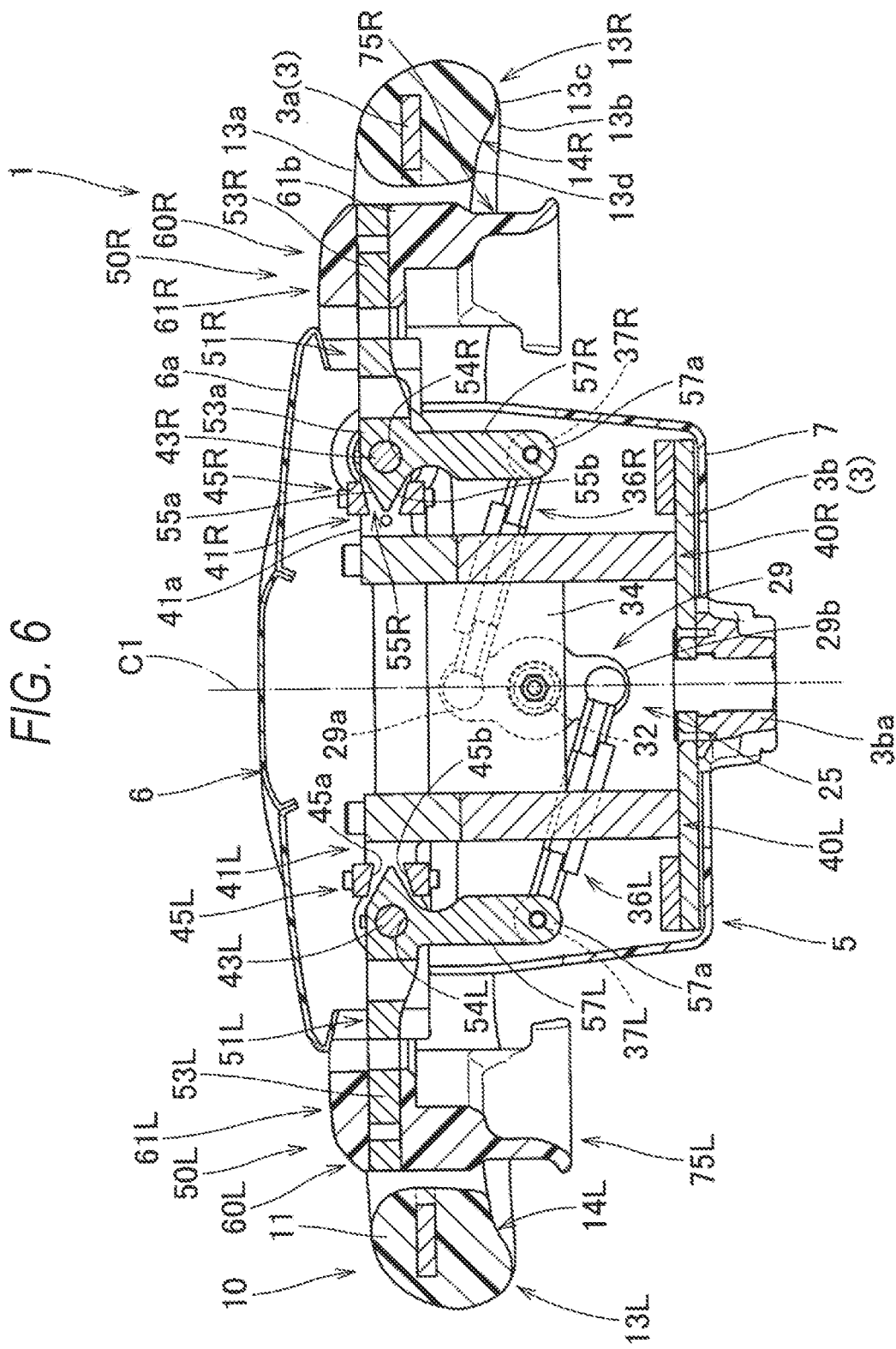
FIG. 6 is a schematic longitudinal cross-sectional view of the steering wheel according to the embodiment taken along a left-right direction.

As shown in FIGS. 1 and 6, the boss portion 5 includes the boss portion core member 3b of the core member 3, the pad 6 made of a synthetic resin and covering an upper side of the boss portion core member 3b, and a lower cover 7 made of a synthetic resin and covering lateral sides and a lower side of the boss portion core member 3b. Although the description with reference numerals is omitted, the lower cover 7 is configured to cover substantially the entire region around the two connecting members 3c and 3c connecting the boss portion core member 3b and the grip portion core member 3a (see FIG. 1). The boss portion core member 3b has a substantially flat plate shape and is disposed in the vicinity of a lower end of the boss portion 5 (see FIGS. 4 to 6). A boss 3ba serving as a connecting portion with a steering shaft (not shown) is disposed in the vicinity of the center of the boss portion core member 3b. In the boss portion 5, an airbag device (not shown) is accommodated in a region between pedestal portions 40L and 40R, which will be described later, between the boss portion core member 3b and the pad 6. In the steering wheel 1 according to the embodiment, the pad 6 is disposed above a grip surface (specifically, upper surfaces 13a substantially orthogonal to the rotation steering central axis C1 in the main grip regions 13L and 13R) of the grip portion 10 over substantially the entire region (see FIG. 6). That is, an upper surface 6a of the pad 6 is positioned above the grip surface 13a.

The grip portion 10 has a substantially rectangular annular shape that is widened in the left-right direction in the straight steering state. Specifically, the outside of a front central portion in plan view is covered with the pad 6 and the lower cover 7 from an upper side to a lower side through a front side (see FIGS. 1 to 3). The grip portion 10 is configured by disposing a covering layer 11 made of a soft synthetic resin having cushioning properties around the grip portion core member 3a having a substantially rectangular annular shape. The grip portion core member 3a has an elongated plate shape, and in the case of the embodiment, the grip portion core member 3a is disposed such that a width direction thereof is substantially orthogonal to the rotation steering central axis C1 (that is, the width direction is substantially along the grip surface 13a) (see FIGS. 6 and 7). The covering layer 11 is made of a soft foamed material such as foamed polyurethane. The grip portion 10 is bilaterally symmetric in the straight steering state.

Figure 7:
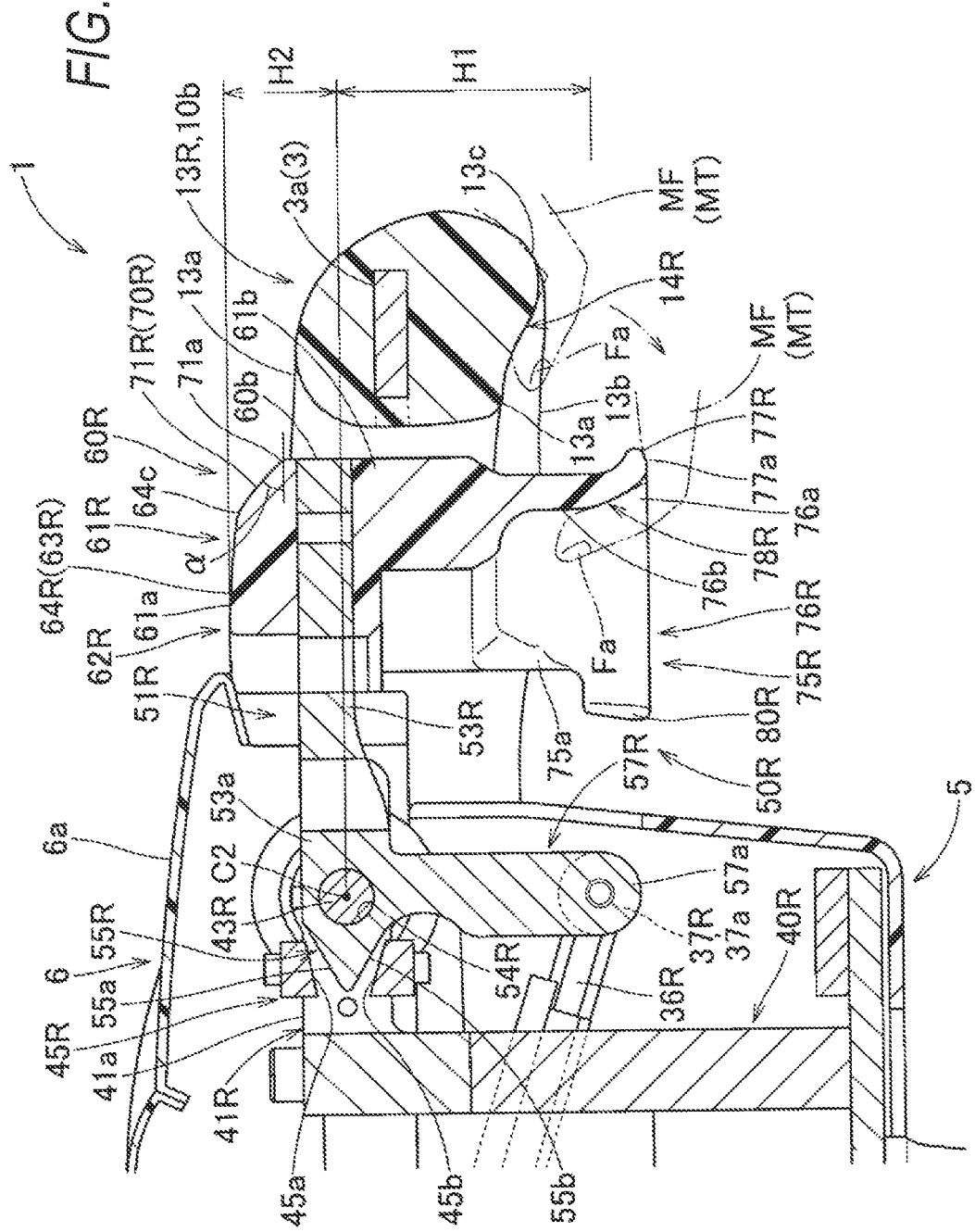
FIG. 7 is a partially enlarged longitudinal cross-sectional view showing the vicinity of a right operation lever portion in the steering wheel according to the embodiment.

The grip portion 10 includes a left portion 10a and a right portion 10b, which are disposed substantially along the front-rear direction in the straight steering state, as the main grip regions 13L and 13R that are mainly gripped during steering. The main grip regions 13L and 13R are substantially bilaterally symmetric and have a substantially elliptical cross section (see FIGS. 1, 5, and 6). As shown in FIGS. 6 and 7, recesses 14L and 14R slightly recessed upward are formed at a side of lower end surfaces 13b of the main grip regions 13L and 13R. Although not shown in detail, the recesses 14L and 14R are formed continuously over substantially the entire regions of the main grip regions 13L and 13R, and in a case where the driver grips the main grip regions 13L and 13R with a hand MH when the operation lever portions 50L and 50R are in a non-operation state or a press-down operation state (non-pull-up operation state), the recesses 14L and 14R are portions on which the driver places fingertips Fa of four fingers MF other than a thumb (see the two-dot chain line in FIG. 7). More specifically, the recesses 14L and 14R are formed so as to be inclined upward from inner sides of the main grip regions 13L and 13R (such that the amount of recess of inner regions in the main grip regions 13L and 13R is increased). By providing such recesses 14L and 14R, positions of the fingertips Fa of the hand MH gripping the main grip regions 13L and 13R can be stabilized, and a grip state can be stabilized. Each of the main grip regions 13L and 13R is formed to be curved such that the vicinity of the center in the front-rear direction (specifically, a position slightly behind the center in the front-rear direction) is positioned outward in the left-right direction when viewed from the up-down direction.

The rear portion 10c, which is disposed substantially along the left-right direction at a rear end of the grip portion 10 during straight steering, constitutes the hand rest portion 16 for the driver to rest his/her hands released from the grip portion 10 (main grip regions 13L and 13R) when the vehicle is stopped, is formed so as to be wider in the up-down direction than the main grip regions 13L and 13R (formed so as to protrude upward from the main grip regions 13L and 13R, see FIG. 3), and as shown in FIG. 2, a front surface 16a thereof is formed in a planar shape such that the driver can easily rest his/her hands. A recess 17 that is partially recessed from an upper end is formed approximately at the center in the left-right direction of the hand rest portion 16. As shown in FIGS. 1 and 2, in a front end of the grip portion 10 during straight steering, recesses 19L and 19R recessed on an upper surface are respectively formed on a left-front portion 10*d* and a right-front portion 10*e*, which are disposed on left and right sides of the pad 6 (between front ends of the main grip regions 13L and 13R and the pad 6). Specifically, the recesses 19L and 19R are formed adjacent to the main grip regions 13L and 13R, respectively. The recesses 19L and 19R are formed continuously from rear surfaces of the left-front portion 10*d* and the right-front portion 10*e* to front surfaces via upper surfaces, respectively. Although not shown in detail, the recesses 19L and 19R can accommodate the thumbs when the driver grips front portions of the main grip regions 13L and 13R.

The operation lever portions 50L and 50R are pivotally supported by rotation shaft portions 43L and 43R provided at a side of the boss portion 5, are configured to allow two operations including a press-down operation of pressing the operation lever portions 50L and 50R downward and a pull-up operation of lifting the operation lever portions 50L and 50R upward while the grip portion 10 (main grip regions 13L and 13R) is gripped, and are configured to receive an accelerator operation and a brake operation by the two operations performed. In the steering wheel 1 according to the embodiment, the accelerator operation is input when the press-down operation is performed, and the brake operation is input when the pull-up operation is performed. As will be described in detail later, the operation lever portions 50L and 50R are configured to be pressed down by a region at a side of thumbs MT of the hands MH of the driver gripping the main grip regions 13L and 13R and to be pulled up by a region at a side of the fingers MF other than the thumbs MT. In the non-operation state or a pull-up operation state (that is, the non-press-down operation state) of the operation lever portions 50L and 50R, as shown by the two-dot chain line in FIG. 1, the thumbs MT are pressed against the upper surfaces 13*a* of the main grip regions 13L and 13R, and in the non-operation state or the press-down operation state (that is, the non-pull-up operation state) of the operation lever portions 50L and 50R, as shown by the two-dot chain line in FIG. 7, the fingertips Fa of the fingers MF other than the thumbs MT are pressed against the lower end surfaces 13*b* of the main grip regions 13L and 13R (in the recesses 14L and 14R).

Figure 4:
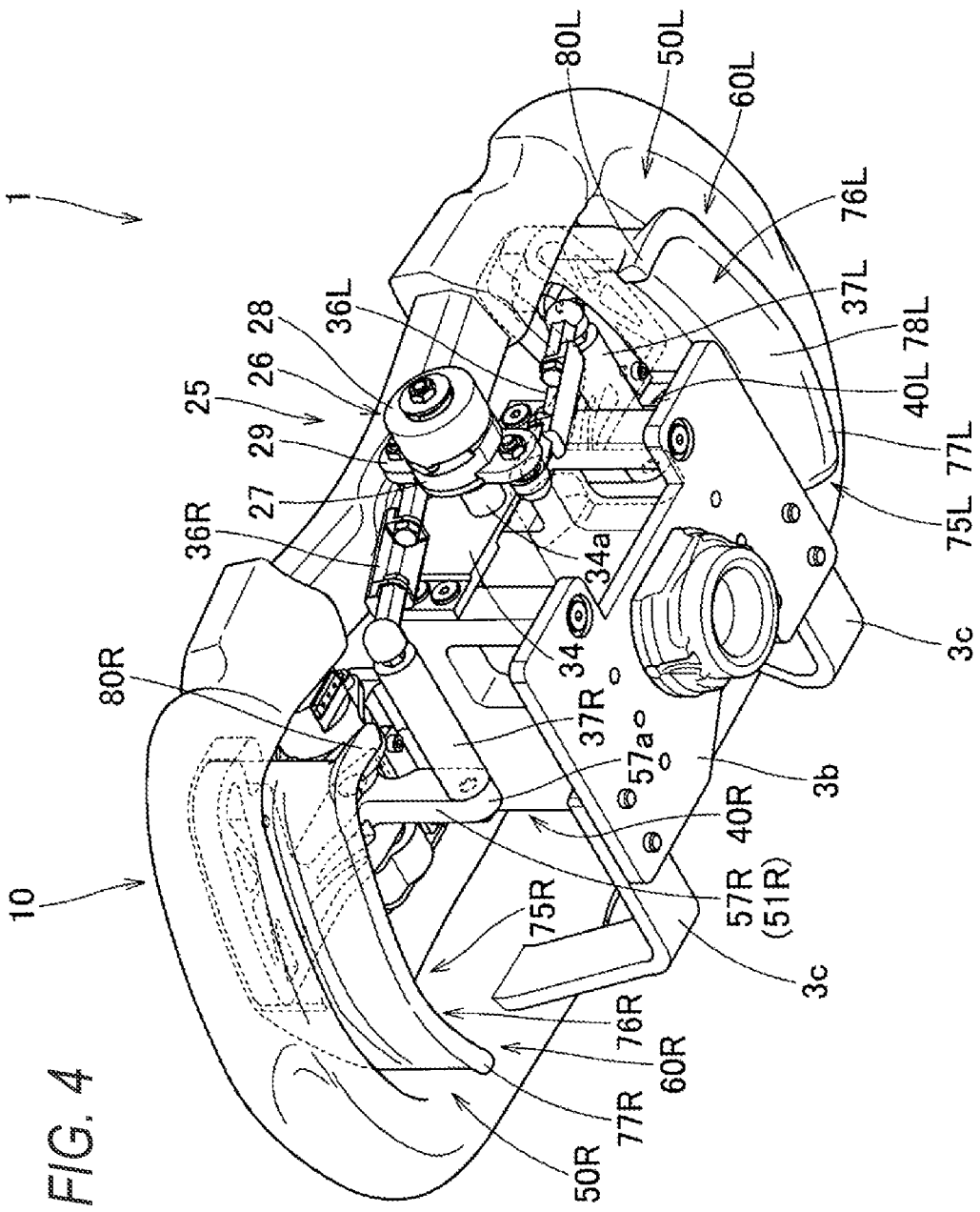
FIG. 4 is a schematic perspective view of the steering wheel according to the embodiment, as viewed from a front lower side, with a pad and a lower cover removed.

In the steering wheel 1 according to the embodiment, the left and right operation lever portions 50L and 50R are synchronized in the rotation operations by the link mechanism 25. For example, when the driver pulls up the operation lever portion 50R while gripping the main grip region 13R, the other operation lever portion 50L rotates so as to be lifted even when the hand of the driver is released. As shown in FIGS. 4 to 6, the link mechanism 25 capable of synchronizing the rotation operations of the left and right operation lever portions 50L and 50R is disposed in a region on the front end of the boss portion 5, and is attached to an attachment bracket 34 attached to the pedestal portions 40L and 40R, which will be described later, to which the operation lever portions 50L and 50R are attached. The attachment bracket 34 is disposed substantially along the up-down direction so as to connect the pedestal portions 40L and 40R on front surfaces of the pedestal portions 40L and 40R (see FIGS. 4 and 6).

Figure 8:
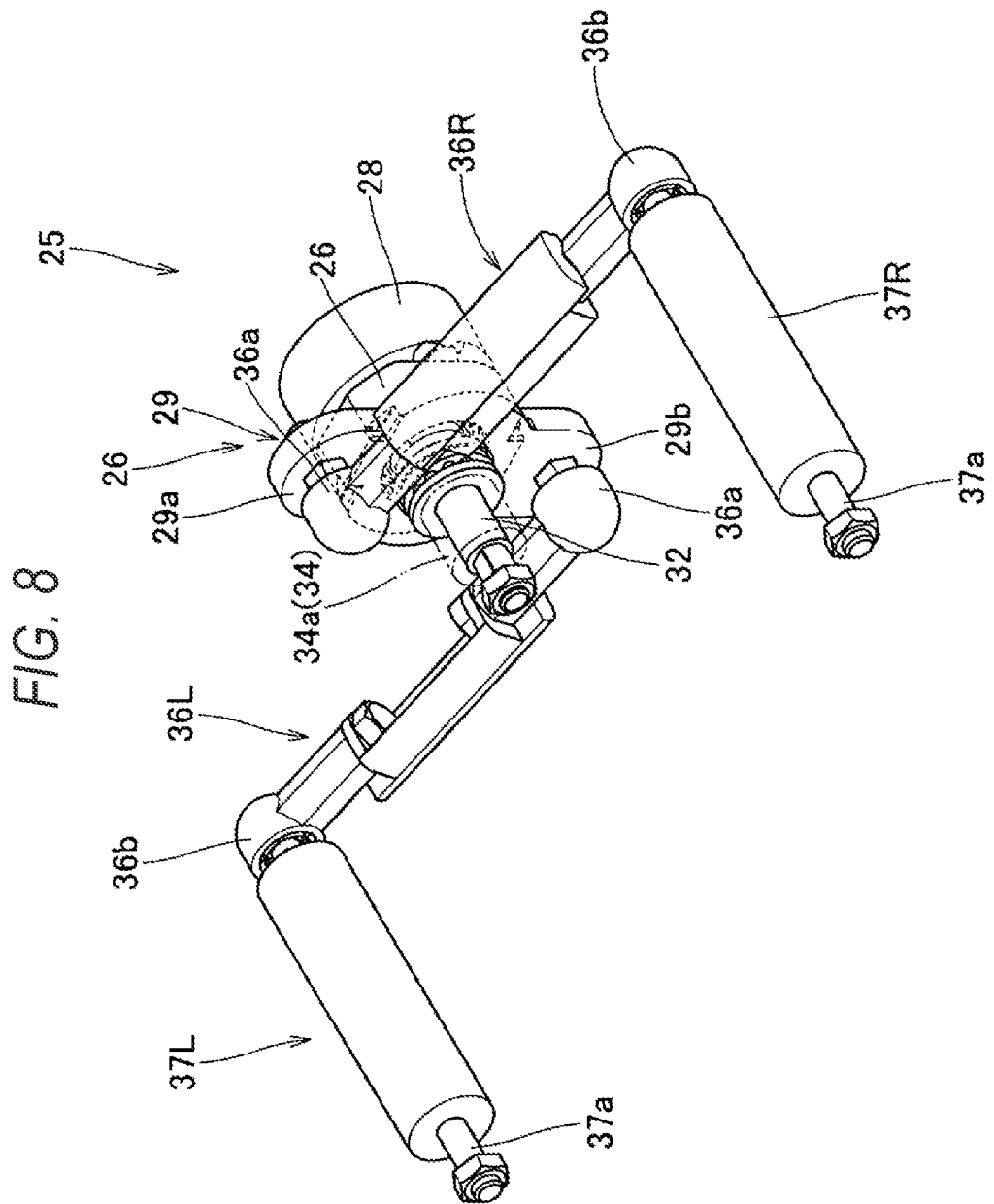
FIG. 8 is a schematic perspective view of a link mechanism used in the steering wheel according to the embodiment.

As shown in FIGS. 4 and 8, the link mechanism 25 includes a cam unit 26, a pair of links 36L and 36R extending from the cam unit 26 and connected to the operation lever portions 50L and 50R, and connecting rods 37L and 37R connecting the links 36L and 36R and the operation lever portions 50L and 50R, and is disposed below the grip surface 13*a* in the case of the embodiment. The cam unit 26 is pivotally supported by a rotation shaft portion 32 disposed substantially orthogonal to the rotation steering central axis C1 and extending substantially in the front-rear direction, and is connected to the attachment bracket 34. The attachment bracket 34 is formed with an insertion cylindrical portion 34*a* protruding forward and into which the rotation shaft portion 32 can be inserted (see FIGS. 4 and 8). The cam unit 26 includes a cam member 27, a pusher 28, and a cam holder 29. The pusher 28 is non-rotatably attached to the rotation shaft portion 32, and has a compression coil spring (not shown) disposed therein. The cam member 27 and the cam holder 29 are rotatable with respect to the rotation shaft portion 32. The cam holder 29 connects the cam member 27 and the links 36L and 36R, and is rotatable with respect to the rotation shaft portion 32 integrally with the cam member 27. In the case of the embodiment, the cam holder 29 is pivotally supported by the rotation shaft portion 32 in the vicinity of the center.

The pair of links 36L and 36R are disposed corresponding to the operation lever portions 50L and 50R, respectively, and two ends (end portions 36*a*) thereof are connected to end portions 29*a* and 29*b* in a longitudinal direction of the cam holder 29 pivotally supported by the rotation shaft portion 32 in the vicinity of the center, and are disposed to extend leftward or rightward about the rotation shaft portion 32 in point symmetry (see FIGS. 6 and 8). The connecting rods 37L and 37R for connecting the links 36L and 36R and the operation lever portions 50L and 50R are disposed to extend rearward from the other two ends (end portions 36*b*) of the links 36L and 36R, and the end portions 37*a* are connected to lower ends 57*a* of connecting pieces 57L and 57R formed on attachment base members 51L and 51R, which will be described later, in the operation lever portions 50L and 50R (see FIGS. 4 and 6). The cam holder 29 is disposed such that the longitudinal direction thereof is substantially along the up-down direction when the operation lever portions 50L and 50R are in the non-operation state (neutral state), and at this time, the links 36L and 36R extend from the end portions 29*a* and 29*b* (above and below the rotation shaft portion 32) of the cam holder 29 in the up-down direction (see FIG. 6).

Figure 11:
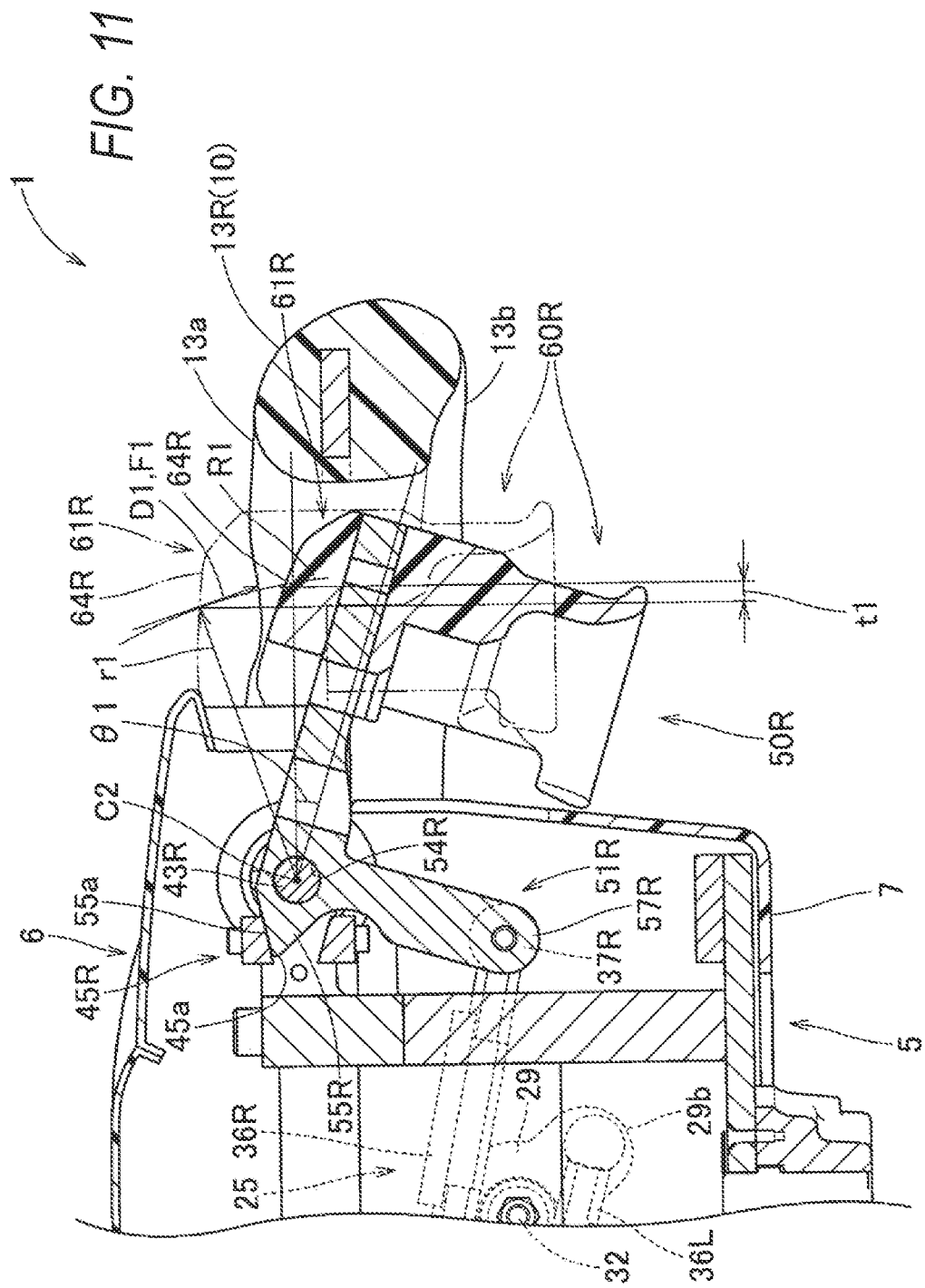
FIG. 11 is a partially enlarged longitudinal cross-sectional view showing a state of a press-down operation of the operation lever portion in the steering wheel according to the embodiment.
Figure 12:
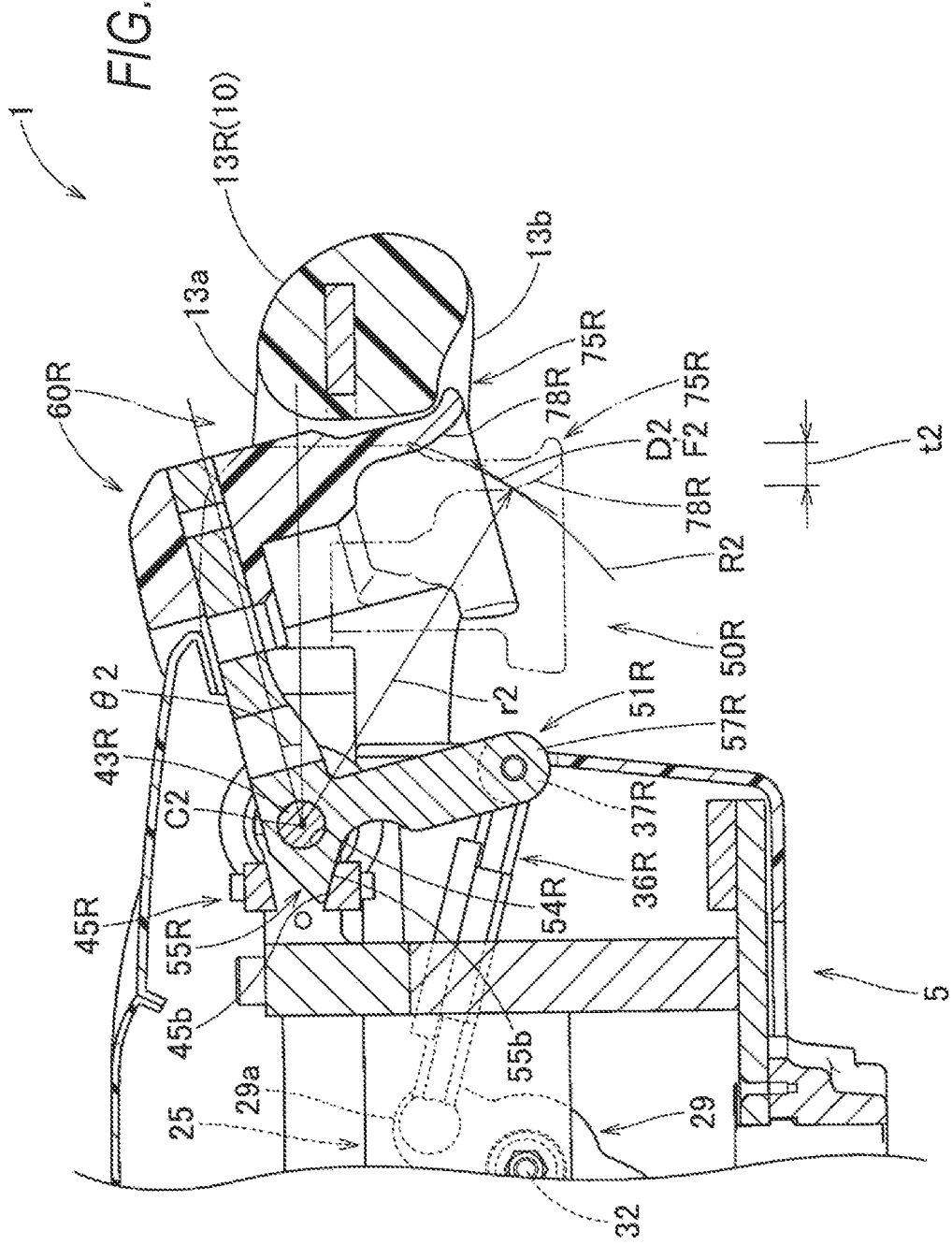
FIG. 12 is a partially enlarged longitudinal cross-sectional view showing a state of a pull-up operation of the operation lever portion in the steering wheel according to the embodiment.

For example, when the operation lever portion 50R is pressed down as shown in FIG. 11, the link 36R moves along with the rotation of the operation lever portion 50R, and the cam holder 29 rotates leftward about the rotation shaft portion 32 together with the cam member 27. At this time, even if only the right operation lever portion 50R is pressed down, the link 36L to which the left operation lever portion 50L is connected moves rightward as the cam holder 29 rotates, so that the left operation lever portion 50L is also pressed down in synchronization with the operation lever portion 50R. When the press-down operation is performed, the compression coil spring (not shown) disposed inside the pusher 28 is compressed as the cam member 27 rotates. On the other hand, when the operation lever portion 50R is pulled up as shown in FIG. 12, the cam holder 29 rotates rightward about the rotation shaft portion 32 together with the cam member 27 due to the movement of the link 36R accompanying the rotation of the operation lever portion 50R. At this time, even if only the right operation lever portion 50R is pulled up, the link 36L to which the left operation lever portion 50L is connected moves leftward as the cam holder 29 rotates, so that the left operation lever portion 50L is also pulled up in synchronization with the operation lever portion 50R. When the pull-up operation is performed, the compression coil spring (not shown) disposed inside the pusher 28 is also compressed as the cam member 27 rotates. The operation states (the press-down operation and the pull-up operation) of the operation lever portions 50L and 50R are restored to the non-operation state when the driver releases his/her hands. At this time, due to the restoration of the compression coil spring accommodated inside the pusher 28, the cam member 27 and the cam holder 29 rotate to return to the neutral state.

The operation lever portions 50L and 50R are attached to the pedestal portions 40L and 40R disposed in the boss portion 5, and include the attachment base members 51L and 51R and lever main bodies 60L and 60R. In the embodiment, the operation lever portion 50R and the pedestal portion 40R disposed at the right side will be taken as an example and explained in detail. Since the operation lever portion 50L and the pedestal portion 40L at the left side are substantially symmetrical to the operation lever portion 50R and the pedestal portion 40R at the right side, "L" is attached to the end of the same reference numerals, and a detailed description thereof will be omitted.

The pedestal portion 40R to which the operation lever portion 50R is attached is made of metal and is formed to extend upward from the boss portion core member 3b. Specifically, the pedestal portion 40R is disposed substantially along the front-rear direction on the right side of the boss 3ba, and has, at an upper end thereof, an attachment portion 41R protruding toward the main grip region 13R (a right side, outward in the left-right direction) (see FIGS. 5 to 7). In the case of the embodiment, an upper surface 41a of the attachment portion 41R is disposed substantially aligned with the grip surface 13a (see FIG. 7). The rotation shaft portion 43R that pivotally supports the operation lever portion 50R is disposed in the attachment portion 41R. The rotation shaft portion 43R is inserted into a bearing portion 54R formed in the attachment base member 51R of the operation lever portion 50R to pivotally support the operation lever portion 50R, and is disposed substantially along the grip surface 13a and substantially along the front-rear direction in the case of the embodiment (see FIGS. 5 and 7). That is, the rotation shaft portion 43R is disposed in the region of the boss portion 5. Specifically, the rotation shaft portion 43R is disposed slightly below the grip surface 13a, in other words, is disposed above the approximate center in the up-down direction of the grip portion 10 (specifically, the main grip region 13R) to be covered with the pad 6. Specifically, the rotation shaft portion 43R has its axis C2 disposed about ⅙ from the top of a width dimension in the up-down direction of the main grip region 13R (see FIG. 7). A stopper 45R that restricts a rotation angle during operation of the operation lever portion 50R is disposed at a base portion side (left side and the center in the left-right direction) of the rotation shaft portion 43R of the attachment portion 41R. The stopper 45R is disposed to cover an upper side and a lower side of a distal end portion 55R that is tapered in the up-down direction on a distal end 53a of a horizontal rod portion 53R, which will be described later, in the attachment base member 51R pivotally supported by the rotation shaft portion 43R, and includes an upper contact surface 45a and a lower contact surface 45b that can come into contact with an upper surface 55a and a lower surface 55b of the distal end portion 55R, respectively (see FIGS. 7, 11, and 12). The upper contact surface 45a and the lower contact surface 45b are formed to be inclined so as to be able to come into contact with the upper surface 55a and the lower surface 55b of the tapered distal end portion 55R over wide surfaces.

Figure 9:
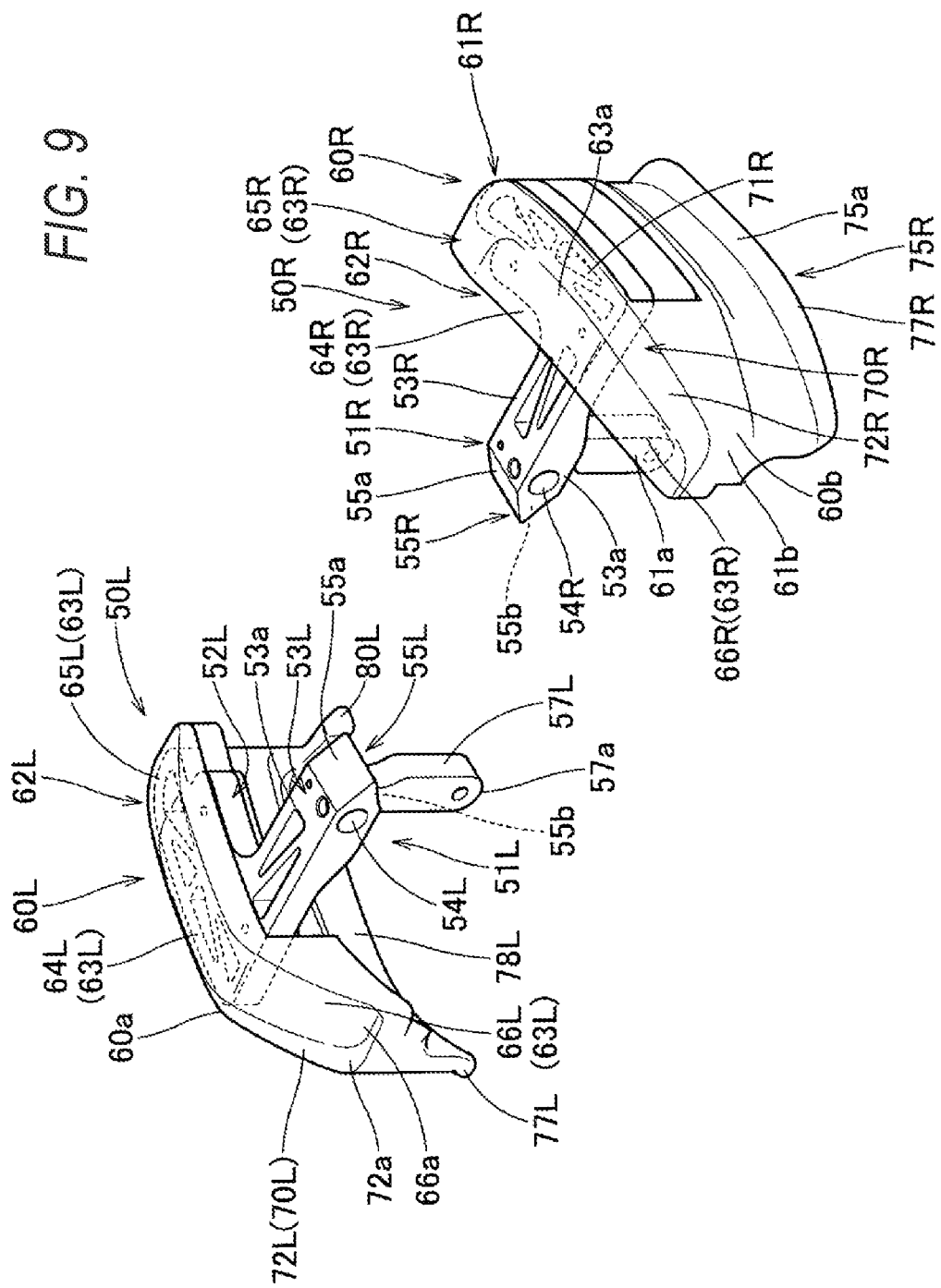
FIG. 9 is a schematic perspective view of an operation lever portion used in the steering wheel according to the embodiment.

The attachment base member 51R of the operation lever portion 50R is made of metal and has a substantially inverted L shape when viewed in the up-down direction, and includes a vertical rod portion 52R disposed substantially along the front-rear direction, and the horizontal rod portion 53R disposed substantially along the left-right direction so as to protrude leftward (to the center in the left-right direction) from a rear end of the vertical rod portion 52R (see FIG. 9). The vertical rod portion 52R is disposed in a region on a front side of the lever main body 60R. Specifically, the vertical rod portion 52R is disposed in a region on a front side of a protruding end 60a, which will be described later, in a press-down operation portion 61R of the lever main body 60R. The horizontal rod portion 53R extending from the rear end of the vertical rod portion 52R protrudes leftward (to the center in the left-right direction) from the vicinity of the center in the front-rear direction of the lever main body 60R. Specifically, the horizontal rod portion 53R is disposed to protrude leftward from a portion of the lever main body 60R near the protruding end 60a. The bearing portion 54R is formed at the distal end 53a of the horizontal rod portion 53R so as to allow the rotation shaft portion 43R to pass therethrough. In the horizontal rod portion 53R, the distal end portion which is the distal end 53a than the bearing portion 54R, has a tapered shape in the up-down direction as described above, and the upper surface 55a and the lower surface 55b of the distal end portion 55R can be brought into contact with the stopper 45R provided on the pedestal portion 40R. The connecting piece 57R extending downward is formed at the distal end 53a of the horizontal rod portion 53R in a region substantially directly below the bearing portion 54R, and as described above, the end portion 37a of the connecting rod 37R is connected to the lower end 57a of the connecting piece 57R at a position substantially directly below the bearing portion 54R (see FIGS. 4 and 7).

The lever main body 60R is made of a synthetic resin, and in the case of the embodiment, the lever main body 60R is disposed to substantially fill the gap between the pad 6 and the main grip region 13R in the grip portion 10 when the steering wheel 1 is viewed from the up-down direction. Specifically, when viewed from the up-down direction, the lever main body 60R is disposed over substantially the entire region in the front-rear direction of the main grip region 13R so as to extend substantially along the main grip region 13R in the front-rear direction (see FIGS. 1 and 2). More specifically, when viewed from the up-down direction, the lever main body 60R is formed to be curved such that an intermediate portion in the front-rear direction (specifically, a portion slightly behind the center in the front-rear direction) protrudes laterally outward (rightward), so as to substantially follow a curved shape of the main grip region 13R. The lever main body 60R includes the press-down operation portion 61R disposed substantially along the grip surface 13a and a pull-up operation portion 75R disposed to extend downward from the end portion 61b of the grip portion 10 (main grip region 13R) in the press-down operation portion 61R, and has a substantially inverted L-shaped cross section (see FIGS. 6 and 7).

Figure 10:
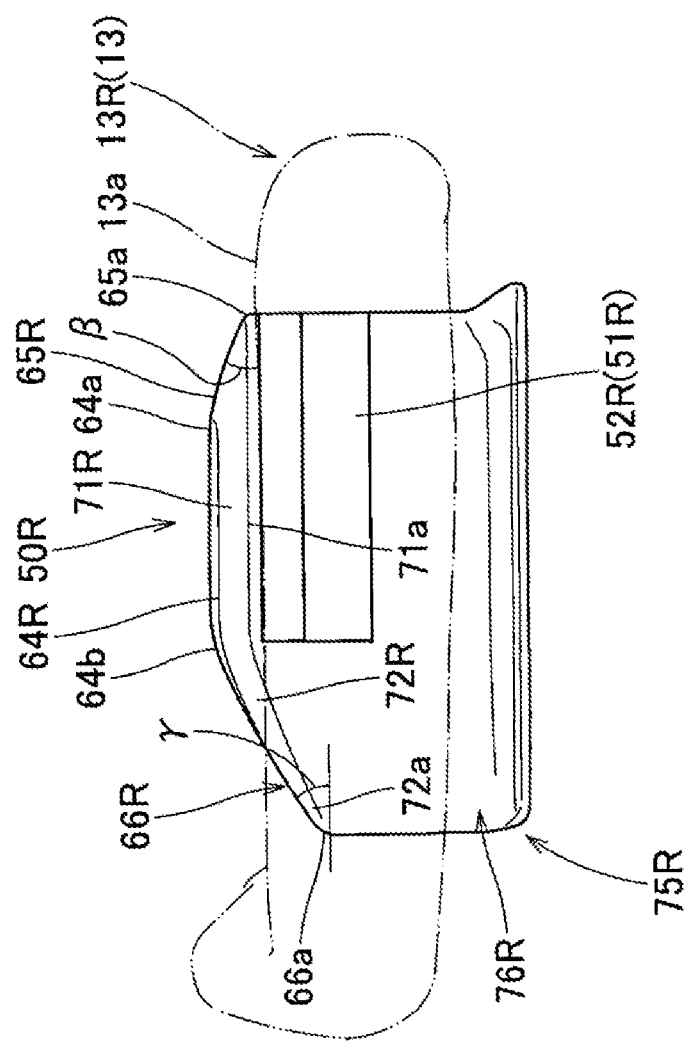
FIG. 10 is a right side view of the right operation lever portion.

The press-down operation portion 61R is disposed close to the grip portion 10 (main grip region 13R) so as to extend in the front-rear direction substantially along the grip surface 13a and substantially along the grip portion 10 (main grip region 13R). In the case of the embodiment, as described above, the press-down operation portion 61R is disposed over substantially the entire region in the front-rear direction of the main grip region 13R. The press-down operation portion 61R is adjacent to a left side of the main grip region 13R (inside the grip portion 10) with a slight gap therebetween. A press-down operation surface 62R is formed on an upper surface 61a of the press-down operation portion 61R. As shown in FIGS. 5, 9, and 10, the press-down operation surface 62R includes an operation surface main body 63R and an inclined surface 70R formed on an edge portion 63a (outer edge) of the operation surface main body 63R close to the grip portion 10. The operation surface main body 63R includes a ceiling surface 64R disposed at an intermediate portion in the front-rear direction of the operation surface main body 63R, a front inclined portion 65R formed at a front edge 64a of the ceiling surface 64R, and a rear inclined portion 66R formed at a rear edge 64b of the ceiling surface 64R. The inclined surface 70R is disposed to be inclined with respect to the operation surface main body 63R so as to approach the grip portion 10 (main grip region 13R) while descending from the operation surface main body 63R. Specifically, in the case of the embodiment, the inclined surface 70R is formed in a region of the operation surface main body 63R excluding an outer side (right side) of the front inclined portion 65R (an outside (right side) region between the ceiling surface 64R and the rear inclined portion 66R).

The ceiling surface 64R of the operation surface main body 63R is disposed to be substantially along the grip surface 13a at a position between the upper surface 6a of the pad 6 and the grip surface (the upper surface 13a of the main grip region 13R) (see FIGS. 6 and 7). Specifically, in the case of the embodiment, the ceiling surface 64R is slightly inclined with respect to the grip surface 13a so as to slightly descend toward the inclined surface 70R (main grip region 13R). The front inclined portion 65R of the operation surface main body 63R is disposed to be inclined with respect to the ceiling surface 64R at the front edge 64a of the ceiling surface 64R so as to approach the grip portion 10 (specifically, the right-front portion 10e) while descending from the ceiling surface 64R (see FIG. 10). In the case of the embodiment, the front inclined portion 65R is formed in a region of about ⅕ of a full length in the front-rear direction of the press-down operation surface 62R in plan view (see FIG. 1). In the case of the embodiment, the front inclined portion 65R is formed so as to smoothly continue from the inclined surface 70R (specifically, a front portion 71R formed on the inclined surface 70R) formed on an outer edge (right edge) 64c of the ceiling surface 64R. The front portion 71R of the inclined surface 70R and the front inclined portion 65R are configured such that end edges (an outer edge 71a and a front edge 65a) of the grip portion 10 are positioned substantially at the same positions as the grip surface 13a (see FIG. 10). The rear inclined portion 66R is disposed to be inclined with respect to the ceiling surface 64R (that is, the grip surface 13a) at the rear edge 64b of the ceiling surface 64R so as to approach the grip portion 10 (specifically, the hand rest portion 16) while descending from the ceiling surface 64R. The rear inclined portion 66R is widely formed in a region of about ⅔ of the full length of the press-down operation surface 62R in the front-rear direction in plan view. Specifically, the rear inclined portion 66R is formed in a region on the rear side from the protruding end 60a protruding to the rightmost side in the lever main body 60R (see FIGS. 1 and 9). In the inclined surface 70R, a rear portion 72R disposed on an outer side (right side) of the rear inclined portion 66R is formed to converge toward a rear end 72a as shown in FIG. The rear inclined portion 66R is configured such that a rear edge 66a close to the grip portion 10 is positioned below the grip surface 13a (see FIG. 10). Specifically, in the case of the embodiment, the rear edge 66a of the rear inclined portion 66R is disposed at a position about ⅓ from the top in the width dimension in the up-down direction of the main grip region 13R (see FIG. 10). In the case of the embodiment, an inclination angle α of the front portion 71R of the inclined surface 70R with respect to the grip surface 13a is set to about 45° (see FIG. 7), an inclination angle β of the front inclined portion 65R with respect to the grip surface 13a is set to about 20°, and an inclination angle γ of the rear inclined portion 66R with respect to the grip surface 13a is set to about 30° (see FIG. 10).

The pull-up operation portion 75R is disposed at a lower end of the press-down operation portion 61R extending downward (that is, substantially along the rotation steering central axis C1) from the end portion 61b (an outer end portion, a right end) close to the grip portion 10 (main grip region 13R), and is configured such that a lower end 75a thereof is positioned below the lower end surface 13b (specifically, an outer lower end surface 13c) of the grip portion 10 (main grip region 13R) (see FIGS. 6 and 7). Specifically, the pull-up operation portion 75R is configured with an operation main body 76R, which is a thin, substantially plate-shaped region extending substantially along the up-down direction at the lower end 75a extending from the press-down operation portion 61R. As shown in FIG. 7, the operation main body 76R is configured such that the entire operation main body 76R is positioned below a recessed distal end surface (that is, an inner lower end surface 13d) of the recess 14R of the main grip region 13R. The operation main body 76R is formed on the outer edge 60b of the lever main body 60R and substantially directly below the inclined surface 70R of the press-down operation surface 62R. A curved portion 77R protruding toward the right side (outside) close to the main grip region 13R is formed at the lower end 76a of the operation main body 76R. The operation main body 76R is configured such that a region from a surface (inner surface 76b) close to the boss portion 5 to a lower end surface 77a of the curved portion 77R serves as a pull-up operation surface 78R. Specifically, the pull-up operation surface 78R is formed substantially directly below a boundary portion between the ceiling surface 64R and the inclined surface 70R (that is, outside the ceiling surface 64R in the left-right direction) (see FIG. 7). In the case of the embodiment, a separation distance in the up-down direction between the pull-up operation surface 78R and the axis C2 of the rotation shaft portion 43R (specifically, a separation distance H1 between an approximate center in the up-down direction of the pull-up operation surface 78R and the axis C2, see FIG. 7) is set to be larger than a separation distance H2 in the up-down direction between the ceiling surface 64R of the press-down operation surface 62R and the axis C2 of the rotation shaft portion 43R, specifically, to be about 8/3 of the separation distance H2. The pull-up operation portion 75R (operation main body 76R) is continuously formed over substantially the entire region in the front-rear direction of the lever main body 60R (see FIG. 4). That is, the pull-up operation portion 75R is disposed over substantially the entire region in the front-rear direction of the main grip region 13R so as to extend in the front-rear direction substantially along the main grip region 13R. As shown in FIGS. 4, 7, and 9, a front end 75b of the pull-up operation portion 75R is provided with an extension portion 80R extending toward the boss portion 5 (leftward, the center in the left-right direction). In the case of the embodiment, the extension portion 80R is formed so as to extend a region of about the lower half of the operation main body 76R, and is formed so as to extend over substantially the entire region in a width direction of the lever main body 60R.

In the steering wheel 1 according to the embodiment, a maximum press-down angle θ1 of the press-down operation portion 61R and a maximum pull-up angle θ2 of the pull-up operation portion 75R are both set to about 15° (see FIGS. 11 and 12). As shown in FIG. 11, the press-down operation portion 61R is configured such that the ceiling surface 64R is positioned below the grip surface 13a when pressed to the maximum, and as shown in FIG. 12, the pull-up operation portion 75R is configured such that a slight gap is provided between the operation main body 76R and the main grip region 13R when pulled up to the maximum.

In the steering wheel 1 according to the embodiment, the operation lever portions 50L and 50R used for the accelerator operation and the brake operation are operable while the grip portion 10 is gripped, and the two operations including the press-down operation of pressing the operation lever portions 50L and 50R downward and the pull-up operation of lifting the operation lever portions 50L and 50R upward are performed by the rotation operation through the single rotation shaft portion 43L or 43R provided at the side of the boss portion 5 so that the operation lever portions 50L and 50R receive the accelerator operation and the brake operation. Therefore, as compared with an operation lever portion of a steering wheel of the related art in which two rotation shaft portions are provided, the configuration of the present disclosure can be simplified. In the steering wheel 1 according to the embodiment, since press-down operation surfaces 62L and 62R of the operation lever portions 50L and 50R, which are operated to be pressed downward, are not disposed across the rotation shaft portions 43L and 43R, but are disposed at the side of the grip portion 10 (main grip regions 13L and 13R) separated from the rotation shaft portions 43L and 43R as shown in FIGS. 5 and 6, it is possible to stably perform the press-down operation no matter which region of the press-down operation surfaces 62L and 62R is pressed. Further, in the steering wheel 1 according to the embodiment, the press-down operation surfaces 62L and 62R (specifically, the ceiling surfaces 64L and 64R of the operation surface main bodies 63L and 63R) are disposed between the grip surface 13a of the grip portion 10 and the upper surface 6a of the pad 6, and the rotation shaft portions 43L and 43R are disposed above the lower end surface 13b of the grip portion 10 (main grip regions 13L and 13R) to be covered with the pad 6. That is, in the steering wheel 1 according to the embodiment, a rotation radius r1 of the press-down operation surfaces 62L and 62R (ceiling surfaces 64L and 64R) during the press-down operation (during the rotation operation) is relatively large (see FIG. 11), and the press-down operation surfaces 62L and 62R (ceiling surfaces 64L and 64R) are disposed substantially laterally of the rotation shaft portions 43L and 43R. A direction of inputting a pressing force F1 during pressing down the ceiling surfaces 64L and 64R is a direction substantially along a tangential direction D1 in a trajectory R1 during the rotation operation with the rotation shaft portions 43L and 43R as the center thereof, but in the steering wheel 1 according to the embodiment, the direction of inputting the pressing force F1 can be approximated in a direction substantially orthogonal to the grip surface 13a as shown in FIG. 11, and by pressing the ceiling surfaces 64L and 64R substantially directly downward, it is possible to press the operation lever portions 50L and 50L downward. Therefore, the operation lever portions 50L and 50R can be easily pressed downward without pressing down the press-down operation surfaces 62L and 62R (ceiling surfaces 64L and 64R) with a strong force.

In the steering wheel 1 according to the embodiment, since the press-down operation surfaces 62L and 62R (ceiling surfaces 64L and 64R) are disposed close to the grip portion 10 (main grip regions 13L and 13R), the driver gripping the grip portion 10 (main grip regions 13L and 13R) can press down the press-down operation surfaces 62L and 62R (ceiling surfaces 64L and 64R) with a part of the hand MEI near the base of the thumb MT (thumb ball TB of a palm, that is, thenar). That is, in the steering wheel 1 according to the embodiment, since the press-down operation surfaces 62L and 62R (ceiling surfaces 64L and 64R) can be stably pressed down on a wide surface near the thumb ball TB of the palm, the operability is good, and since it is easier to apply a force to a part near the thumb ball TB as compared with the case of pressing the press-down operation surfaces 62L and 62R with a fingertip, a press-down state can be stably maintained for a predetermined time. As a result, it is possible to stably perform the brake operation or the accelerator operation by such a press-down operation.

Therefore, the steering wheel 1 according to the embodiment has a simple structure and can be stably operated.

In the steering wheel 1 according to the embodiment, the rotation shaft portions 43L and 43R are disposed above the approximate center in the up-down direction of the grip portion 10 (main grip regions 13L and 13R). Therefore, a separation distance between the rotation shaft portions 43L and 43R and the press-down operation surfaces 62L and 62R (ceiling surfaces 64L and 64R) in the up-down direction can be further reduced, the direction (direction substantially along the tangential direction D1 in the trajectory R1 during the rotation operation with the rotation shaft portions 43L and 43R as the center thereof) of inputting the pressing force F1 when pressing down the ceiling surfaces 64L and 64R is further approximated in the direction substantially orthogonal to the grip surface 13a, and the operability of the press-down operation of the operation lever portions 50L and 50R is further improved. In the steering wheel 1 according to the embodiment, since a separation distance t1 in a direction along the grip surface 13a between a start point and an end point of the press-down operation is small (see FIG. 11), the press-down operation surfaces 62L and 62R can be easily pressed down to a maximum press-down state by being pressed substantially straight down. If such a point is not taken into consideration, the rotation shaft portion may be disposed below the approximate center in the up-down direction of the grip portion.

Further, in the steering wheel 1 according to the embodiment, the pull-up operation portions 75L and 75R formed in the operation lever portions 50L and 50R are disposed at lower ends extending downward from the end portions 61b of the press-down operation portions 61L and 61R close to the grip portion 10 (main grip regions 13L and 13R), and the pull-up operation surfaces 78L and 78R including lower end surfaces of the pull-up operation portions 75L and 75R (lower end surface 77a of the curved portion 77) and surfaces (inner surface 76b) at the lower ends close to the boss portion 5 are disposed in a region below the lower end surface 13b (specifically, the inner lower end surface 13d) of the grip portion 13. That is, in the steering wheel 1 according to the embodiment, the pull-up operation surfaces 78L and 78R are disposed separated from the rotation shaft portions 43L and 43R in the up-down direction as compared with the press-down operation surfaces 62L and 62R. Similar to the direction of inputting the pressing force F1 when pressing down the press-down operation surfaces 62L and 62R (ceiling surfaces 64L and 64R), a direction of inputting a tensile force F2 during pulling up the pull-up operation portions 75L and 75R is a direction substantially along a tangential direction D2 in a trajectory R2 during the rotation operation with the rotation shaft portions 43L and 43R as the center thereof, but since the pull-up operation surfaces 78L and 78R are disposed separated from the rotation shaft portions 43L and 43R in the up-down direction than the ceiling surfaces 64L and 64R, the direction (tangential direction D2) of inputting the tensile force F2 is along an oblique direction approaching the grip portion 10 while being inclined with respect to the grip surface 13a as shown in FIG. 12 (a separation distance t2 in the direction along the grip surface 13a between a start point and an end point of the pull-up operation is larger than the separation distance t1 in the direction along the grip surface 13a between the start point and the end point of the press-down operation, see FIGS. 11 and 12). Therefore, when the driver presses the fingertips Fa of four fingers F (forefinger, middle finger, and the like) of the hands gripping the grip portion 10 (main grip regions 13L and 13R) excluding the thumbs against the pull-up operation surfaces 78L and 78R formed at the lower ends 75a of the pull-up operation portions 75L and 75R and pulls the pull-up operation surfaces 78L and 78R to the near side (toward the grip portion 10), the operation lever portions 50L and 50R can be lifted with respect to the grip portion 10. As a result, the operability when lifting the operation lever portions 50L and 50R with respect to the grip portion 10 (main grip regions 13L and 13R) is improved. Such a pull-up operation can be implemented by an operation of gripping the pull-up operation portions 75L and 75R with the fingertips Fa of the hands MH gripping the main grip regions 13L and 13R (see FIG. 14), and thus a pull-up state can be stably maintained for a predetermined time.

The steering wheel 1 according to the embodiment is configured to adjust a speed of a vehicle by the press-down operation or pull-up operation of the operation lever portions 50L and 50R. It is considered that such a steering wheel 1 is mounted on a vehicle for persons with handicapped lower limbs or the like. Specifically, in the steering wheel 1 according to the embodiment, the accelerator operation is input when the press-down operation of the operation lever portions 50L and 50R is performed, and the brake operation is input when the pull-up operation of the operation lever portions 50L and 50R is performed. In order to change (accelerate or decelerate) to a desired speed, it is necessary to maintain the operation state for a predetermined time for both the accelerator operation and the brake operation, and normally, the greater the amount of press-down or the amount of pull-up, the greater the load on the hand of the driver. That is, it is necessary to maintain the press-down state and the pull-up state of the operation lever portions 50L and 50R for a predetermined time with a large force. During traveling, an accelerator is usually operated more often than a brake, and the operation time is also longer.

Figure 13:
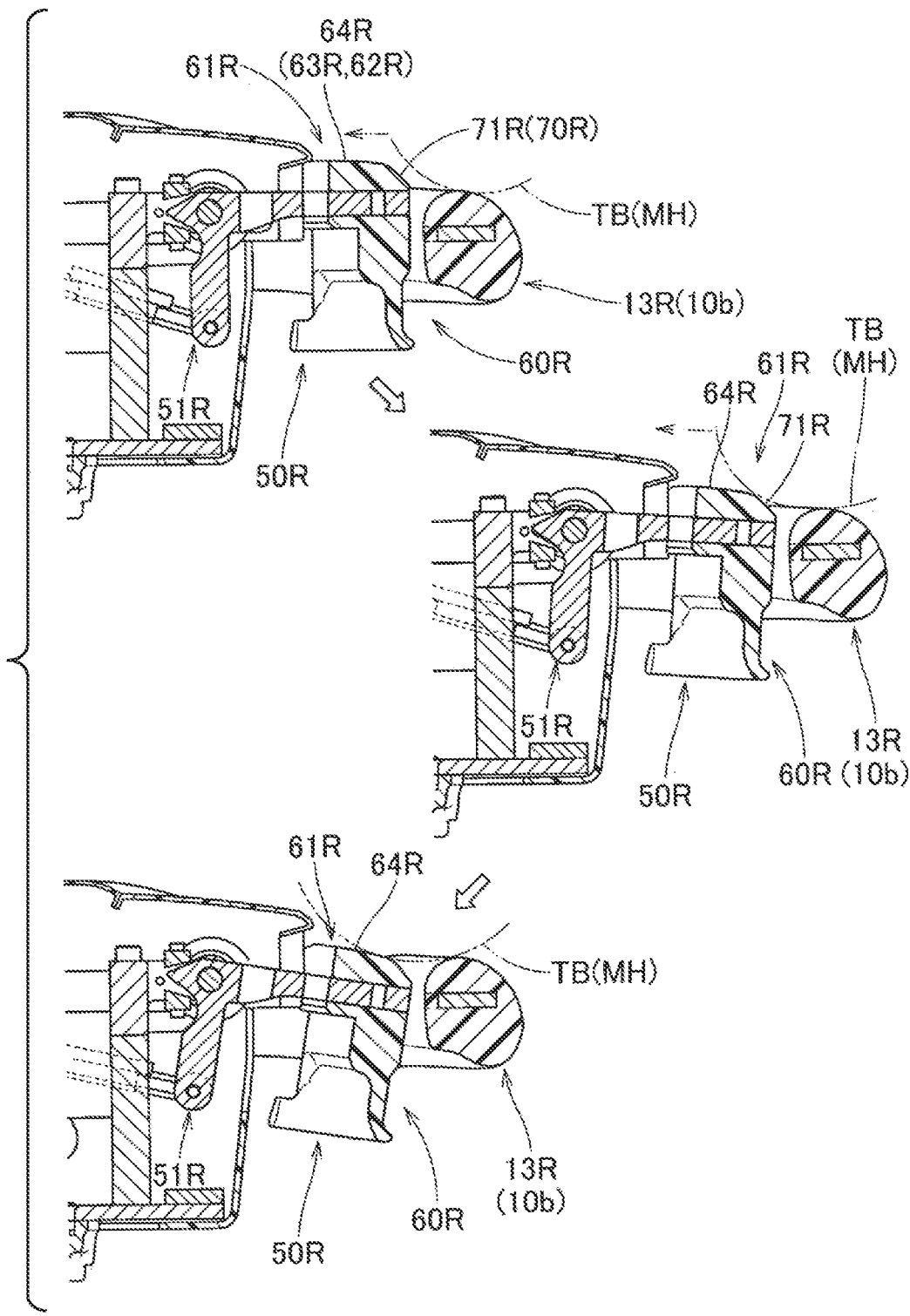
FIG. 13 is a schematic longitudinal cross-sectional view illustrating a state in which the operation lever portion is pressed down in the steering wheel according to the embodiment.

In the steering wheel 1 according to the embodiment, the accelerator operation is input when the press-down operation of the operation lever portions 50L and 50R is performed, and as described above, the driver gripping the grip portion 10 (main grip regions 13L and 13R) can press down the press-down operation surfaces 62L and 62R (ceiling surfaces 64L and 64R) with a part of the hand MH near the base of the thumb MT (thumb ball TB of the palm, that is, thenar). The press-down operation surfaces 62L and 62R are provided with the inclined surfaces 70L and 70R at edge portions of the ceiling surfaces 64L and 64R, which are actually pressed down, close to the grip portion 10 (main grip regions 13L and 13R). Therefore, when the driver presses with the vicinity of the thumb ball TB of the hands MH gripping the main grip regions 13L and 13R while displacing inward (toward the operation lever portions 50L and 50R) with the inclined surfaces 70L and 70R as guides, the ceiling surfaces 64L and 64R can be pressed down (see FIG. 13), and the operability is good. Since the driver can stably press down the ceiling surfaces 64L and 64R over a wide surface with the portion near the thumb ball TB to which a large force is easily applied, the press-down state can also be stably maintained for a predetermined time. Further, since the recesses 14L and 14R slightly recessed upward are formed on lower surfaces of the main grip regions 13L and 13R, when the driver grips the main grip regions 13L and 13R by placing the fingertips Fa of the four fingers MF other than the thumbs MT on inner peripheral surfaces of the recesses 14L and 14R, even if the driver moves the vicinity of the base of the thumb MT during the press-down operation, the grip state of the main grip regions 13L and 13R can be stably maintained. That is, by providing such recesses 14L and 14R, the grip state of the main grip regions 13L and 13R can be stabilized, and the press-down operation with the portion near the base of the thumb MT (the portion of the thumb ball TB of the palm) can also be stably performed.

More specifically, in the steering wheel 1 according to the embodiment, the operation surface main bodies 63L and 63R of the press-down operation surfaces 62L and 62R formed on the upper surfaces 61a of the press-down operation portions 61L and 61R have the ceiling surfaces 64L and 64R substantially along the grip surface 13a disposed at the intermediate portions in the front-rear direction, and the front inclined portions 65L and 65R and the rear inclined portions 66L and 66R descending from the ceiling surfaces 64L, 64R and approaching the grip portion 10 are disposed on the front edges 64a and the rear edges 64b of the ceiling surfaces 64L and 64R, respectively. Therefore, in a case where the driver grips front end regions or rear end regions deviated from the vicinity of the center in the front-rear direction (regions laterally of the ceiling surfaces 64L and 64R) of the main grip regions 13L and 13R, the driver can smoothly press down the front inclined portions 65L and 65R or the rear inclined portions 66L and 66R with the thumbs MT when displacing the hands MH gripping the main grip regions 13L and 13R inward (toward the operation lever portions 50L and 50R). By providing the front inclined portions 65L and 65R, for example, when the driver grips front portions of the main grip regions 13L and 13R by putting tips of the thumbs on the recesses 19L and 19R formed in the left-front portion 10d and the right-front portion 10e of the grip portion 10, bases of the thumbs are brought into contact with the regions of the front inclined portions 65L and 65R which are smoothly inclined. Further, the rear inclined portions 66L and 66R are configured such that the rear edges 66a close to the grip portion 10 are positioned below the grip surface 13a. Therefore, when gripping the rear regions of the main grip regions 13L and 13R, the driver can smoothly displace the regions near the thumb ball, which are near the bases of the thumbs, onto the rear inclined portions 66L and 66R, and can stably press down the rear inclined portions 66L and 66R with the regions near the thumb ball (thenar).

Figure 14:
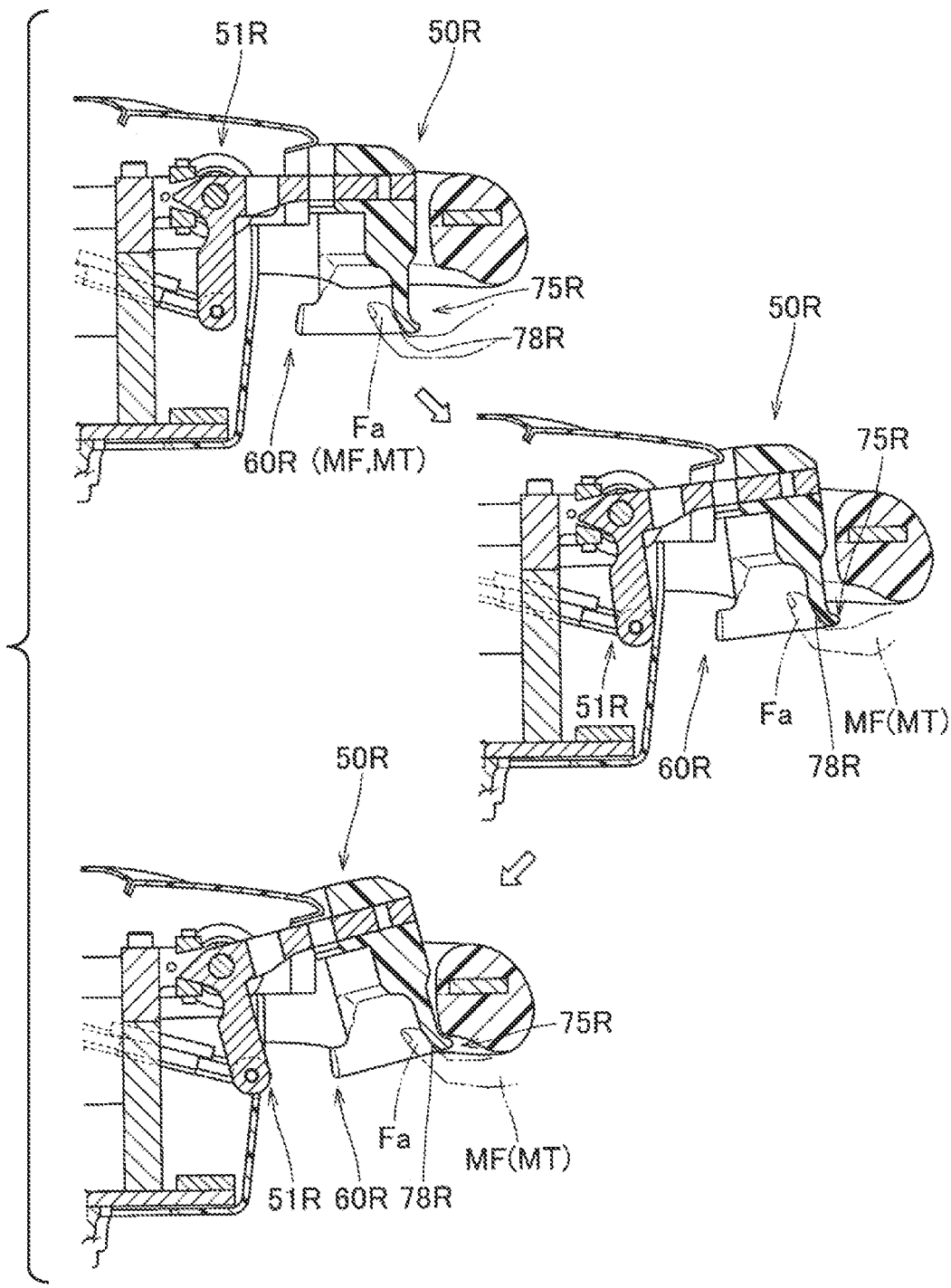
FIG. 14 is a schematic longitudinal cross-sectional view illustrating a state in which the operation lever portion is pulled up in the steering wheel according to the embodiment.

Further, in the steering wheel 1 according to the embodiment, the brake operation is input when the pull-up operation of the operation lever portions 50L and 50R is performed, and as described above, when the driver presses the fingertips Fa of the fingers MF (forefinger, middle finger, and the like) of the hands MH gripping the grip portion 10 (main grip regions 13L and 13R) excluding the thumbs MT against the pull-up operation surfaces 78L and 78R and pulls the pull-up operation surfaces 78L and 78R to the near side (toward the grip portion 10 (main grip regions 13L and 13R)), the operation lever portions 50L and can be lifted upward (see FIG. 14). Such a pull-up operation can be implemented by an operation of gripping the operation main bodies 76L and 76R of the pull-up operation portions 75L and 75R with the fingertips Fa of the hands MH gripping the main grip regions 13L and 13R, and thus the operability is good. In particular, in the steering wheel 1 according to the embodiment, the pull-up operation surfaces 78L and 78R are disposed separated in the up-down direction from the rotation shaft portions 43L and 43R and are disposed outward of the ceiling surfaces 64L and 64R in the left-right direction, as compared with the ceiling surfaces 64L and 64R of the press-down operation surfaces 62L and 62R. That is, since the pull-up operation portions 75L and 75R have a larger rotation radius r2 during operation than the rotation radius r1 during operation of the press-down operation portions 61L and 61R (see FIGS. 11 and 12), and a torque during the pull-up operation can be smaller than a torque during the press-down operation of the press-down operation portions 61L, 61R, the pull-up operation portions 75L and 75R can be operated with a small tensile force (light force) as compared with the press-down operation. Further, since the operation main bodies 76L and 76R of the pull-up operation portions 75L and 75R are formed on the outer edges 60b of the lever main bodies 60L and 60R, the operation main bodies 76L and 76R are close to the fingertips Fa of the hands MH gripping the main grip regions 13L and 13R, and can be easily gripped by the fingertips Fa. As a result, in a configuration in which the pull-up operation portion is pulled up with fingertips of four fingers excluding the thumb, the operability is good, and the pull-up state can be stably maintained for a predetermined time.

In the steering wheel 1 according to the embodiment, as shown in FIGS. 2, 9, and 10, in the operation lever portions 50L and 50R, since the press-down operation surfaces 62L and 62R formed on the upper surfaces 61a of the press-down operation portions 61L and 61R are configured such that, three of peripheral edges of the ceiling surfaces 64L and 64R that are mainly pressed down, excluding a peripheral edge close to the pad 6 (inner side), are inclined downward, that is, the three peripheral edges excluding an inner edge are chamfered, when the press-down operation portions 61L and 61R such that the part near the thumb ball TB is displaced and moved, the operation lever portions 50L and 50R can be prevented from partially biting into the hands of the driver or partially strongly hitting the hands of the driver, and can be operated comfortably.

In the steering wheel 1 according to the embodiment, the accelerator operation is input when the press-down operation of the operation lever portions 50L and 50R is performed, and the brake operation is input when the pull-up operation of the operation lever portions 50L and 50R is performed. Needless to say, the brake operation may be input when the press-down operation is performed, and the accelerator operation may be input when the pull-up operation is performed. However, since the accelerator operation is performed more often than the brake operation, the operation time is longer, and it is easier to apply a large force in the press-down operation than in the pull-up operation, it is preferable that the accelerator operation is input when the press-down operation is performed and the brake operation is input when the pull-up operation is performed as in the embodiment.

What is claimed is:

1. A steering wheel comprising:
   a boss portion disposed at a side of a rotation steering center;
   a grip portion disposed around the boss portion and gripped during rotation steering; and
   an operation lever portion disposed in a region between the boss portion and the grip portion,
   wherein the operation lever portion is pivotally supported by a rotation shaft portion provided at a side of the boss portion, is configured to allow two operations including a press-down operation of pressing the operation lever portion downward and a pull-up operation of lifting the operation lever portion upward while the grip portion is gripped, and is configured to receive an accelerator operation and a brake operation by the two operations performed,
   a press-down operation surface of the operation lever portion is disposed substantially along a grip surface of the grip portion, at a side separated from the rotation shaft portion and close to the grip portion, between the grip surface of the grip portion and an upper surface of a pad disposed to cover an upper surface of the boss portion, the grip surface being formed of an upper surface, which is substantially orthogonal to a rotation steering central axis, of the grip portion, and
   the rotation shaft portion is disposed above a lower end surface of the grip portion to be covered with the pad.

2. The steering wheel according to claim 1,
   wherein the rotation shaft portion is disposed above an approximate center in an up-down direction of the grip portion.

3. The steering wheel according to claim 2,
   wherein the operation lever portion includes a press-down operation portion having the press-down operation surface on an upper surface of the operation lever portion and disposed substantially along the grip surface, and a pull-up operation portion disposed at a lower end extending downward from an end portion of the press-down operation portion close to the grip portion,
   the pull-up operation portion is configured to allow a lower end surface of the operation lever portion and a surface close to the boss portion, which is disposed substantially along the rotation steering central axis at the lower end of the operation lever portion, to serve as a pull-up operation surface, and
   the pull-up operation surface is disposed in a region below the lower end surface of the grip portion.

4. The steering wheel according to claim 1, wherein
   the operation lever portion is one operation lever portion of a pair of operation lever portions, and
   the steering wheel further comprises a link mechanism disposed in the boss portion, the link mechanism connecting the pair of operation lever portions such that when one operation lever portion of the pair of operation lever portions is pulled up, the other operation lever portion of the pair of operation lever portions rotates so as to be lifted and such that when the one operation lever portion of the pair of operation lever portions is pushed down, the other operation lever portion of the pair of operation lever portions rotates so as to be lowered.

5. The steering wheel according to claim 4, wherein the link mechanism comprises a cam unit,
a pair of links extending from the cam unit, and
a pair of connecting rods each connecting one link of the pair of links to one operation lever portion of the pair of operation lever portions.

* * * * *